(12) United States Patent
Metze, III et al.

(10) Patent No.: US 11,816,797 B1
(45) Date of Patent: *Nov. 14, 2023

(54) RAPID GENERATION OF THREE-DIMENSIONAL CHARACTERS

(71) Applicant: Radical Convergence Inc., Reston, VA (US)

(72) Inventors: Charles Levi Metze, III, Washington, DC (US); Harold Benjamin Helmich, Sterling, VA (US); Jacob Nathaniel Fisher, Arlington, VA (US); Jeffrey Michael Olson, Reston, VA (US)

(73) Assignee: Radical Convergence Inc., Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/719,434

(22) Filed: Apr. 13, 2022

Related U.S. Application Data

(63) Continuation of application No. 17/095,270, filed on Nov. 11, 2020, now Pat. No. 11,328,480.

(60) Provisional application No. 62/935,129, filed on Nov. 14, 2019.

(51) Int. Cl.
*G06T 17/20* (2006.01)
*G06T 15/04* (2011.01)
*G06T 7/73* (2017.01)

(52) U.S. Cl.
CPC ............... *G06T 17/20* (2013.01); *G06T 7/74* (2017.01); *G06T 15/04* (2013.01); *G06T 2200/04* (2013.01); *G06T 2207/20081* (2013.01)

(58) Field of Classification Search
None
See application file for complete search history.

(56) References Cited

U.S. PATENT DOCUMENTS

| | | |
|---|---|---|
| 10,529,137 B1 | 1/2020 | Black et al. |
| 2003/0184544 A1 | 10/2003 | Prudent |
| 2005/0134586 A1 | 6/2005 | Koo et al. |

(Continued)

OTHER PUBLICATIONS

Digital Foundry, "[4K] Star Citizen: A Next-Gen Experience In The Making . . . and You Can Play-Test It Now," Oct. 17, 2019, https://www.youtube.com/watch?v=OngP6uEfQoE&feature=youtu.be&t=584, Accessed Nov. 10, 2020.

(Continued)

*Primary Examiner* — Edward Martello
(74) *Attorney, Agent, or Firm* — Banner & Witcoff, Ltd.

(57) ABSTRACT

Aspects described herein relate to three-dimensional (3D) characters and rapidly generating 3D characters from a plurality of 3D source models. In generating the 3D characters, one or more 3D source models may be standardized, applied to a base mesh with material ID assignments, and decomposed to isolate particular polygonal mesh pieces and/or texture map feature selections denoted by the material IDs of the base mesh. The disparate isolated polygonal mesh pieces and/or texture map feature selections may be assembled in a modular fashion to compose unique 3D characters unlike any of those of the one or more 3D models. The 3D characters may be further refined through the addition of features and/or accessories, and may also be processed through machine learning algorithms to further ascertain uniqueness.

23 Claims, 17 Drawing Sheets
(10 of 17 Drawing Sheet(s) Filed in Color)

(56) References Cited

U.S. PATENT DOCUMENTS

2014/0274373 A1     9/2014  Olshan et al.
2016/0078663 A1*    3/2016  Sareen ................. G06V 40/103
                                                              345/419

OTHER PUBLICATIONS

Palumbo, Alessio, "Watch Dogs Legion's Creative Director on the 'Crazy' Idea of Playable NPCs and How Ubisoft Implemented It," Jan. 20, 2019, https://wccftech-com.cdn.ampproject.org/v/s/wccftech.com/watch-dogs-legion-creative-director-playable-npcs/amp/?amp_js_v=0.1.

Pixologic ZBrush, "Inside Look of Beyond Good and Evil 2 with Ubisoft Montpellier—2019 ZBrush Summit," Sep. 28, 2019, https://www.youtube.com/watch?v=uEnUO690GkQ&feature=youtu.be&t=2649.

R3DS—Russian3DScanner, Accessed Nov. 10, 2020, https://www.russian3dscanner.com/.

"Replace—R3DS Wrap Documentation," Accessed Nov. 10, 2020, https://www.russian3dscanner.com/docs/Wrap/Nodes/Replace/Replace.html?highlight=replace.

* cited by examiner

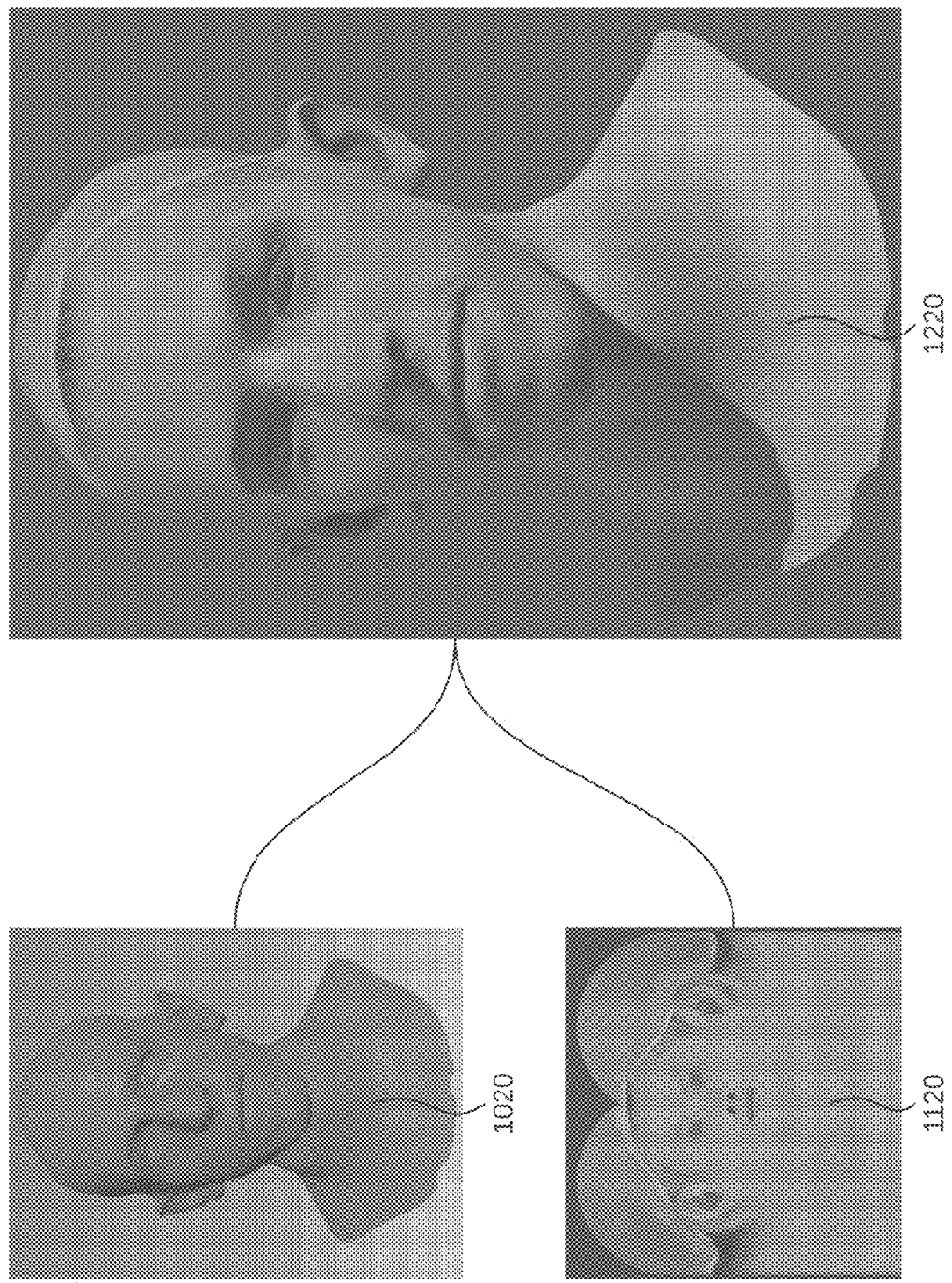

RAPID GENERATION OF THREE-DIMENSIONAL CHARACTERS

CROSS-REFERENCE TO RELATED APPLICATIONS

This application is a continuation of U.S. application Ser. No. 17/095,270, filed Nov. 11, 2020, entitled "Rapid Generation of Three-Dimensional Characters", which in turn claims priority to provisional U.S. Application No. 62/935,129, filed on Nov. 14, 2019, entitled "Rapid Generation of Three-Dimensional Characters," each of which is herein incorporated by reference for all purposes.

FIELD

Aspects described herein generally relate to computer graphics rendering, character generation, software-based three-dimensional (3D) characters and generating 3D characters. More specifically, aspects relate to 3D characters and methods and systems for rapidly generating 3D characters from a plurality of 3D source models.

BACKGROUND

Film, visual effects, virtual reality, gaming, architectural visualization, and television industries often require thousands of three-dimensional (3D) digital characters to cultivate compelling visual narratives, deepen immersion, and bring realistic and highly detailed stories to life. Whether it be for a constellation of intertwined figures in a role-playing game, or battalions of soldiers in an action movie, the uniqueness of such characters is paramount in producing a high-quality end product expected by today's consumers.

Many processes, with varying deficiencies, are currently being utilized to create 3D characters that are detailed and unique from one another. For example, methods such as sculpting/modeling and blend-shapes/morphing are implemented to create unique 3D characters from existing mesh constructs. However, such methods are labor intensive and require significant technical skill and artistic ability for a graphic artist to produce highly detailed and unique characters.

Alternatively, a more integrated approach may be implemented which first requires scans of human models to be taken through technologies such as LIDAR, photogrammetry, and hand and/or turntable scanning. Next, the scans are processed by graphic artists to refine the representations of the models into production quality products. As with sculpting/modeling and blend-shapes/morphing, however, refinement processes are resource intensive and often require significant human involvement to bring the 3D characters to a high enough quality to be used in a production setting. To make matters more challenging, the number of unique characters needed roughly correlates to the number of model scans required to be taken, so in the event that a game or film calls for thousands of disparate individuals or characters, a production company may be faced with considerable or even insurmountable challenges in acquiring the requisite data.

BRIEF SUMMARY

The following presents a simplified summary of various aspects described herein. The summary is not an extensive overview, and is not intended to identify key or critical elements or to delineate the scope of the claims. The following summary merely presents some concepts in a simplified form as an introductory prelude to the more detailed description below.

To overcome the limitations in the prior art described above, and to overcome other limitations that will be apparent upon reading the present specification, aspects described herein are directed towards three-dimensional (3D) characters and methods for programmatically and rapidly generating 3D characters from a plurality of 3D source models.

In accordance with one or more embodiments, a computing device having at least one processor and memory may standardize a plurality of 3D models through a standardization procedure. A base mesh may be shrink-wrapped onto each of a plurality of standardized 3D models, wherein the base mesh may comprise a plurality of material IDs, each corresponding to one or more features. The computing device may then associate one or more of the plurality shrink-wrapped 3D models with each of the plurality of material IDs of the base mesh. Based on the association with the material IDs of the base mesh, the computing device may extract a polygonal mesh piece from each of the one or more shrink-wrapped 3D models. The computing device may then generate a composite mesh by assembling the extracted polygonal mesh pieces from the one or more shrink-wrapped 3D models corresponding to each material ID of the base mesh.

In some embodiments, the computing device may extract a texture map feature selection from each of the one or more shrink-wrapped 3D models corresponding to the material ID to which each of the one or more shrink-wrapped 3D models were assigned. Furthermore, the computing device may generate a composite texture map by assembling the extracted texture map feature selections from the one or more shrink-wrapped 3D models corresponding to each material ID of the base mesh.

In other embodiments, the computing device may generate a 3D character by combining the composite mesh and the composite texture map.

In other embodiments, one or more machine learning algorithms may be run on the composite mesh to determine the uniqueness of the composite mesh in relation to one or more of the plurality of 3D models and a plurality of previously generated composite meshes.

In other embodiments, the computing device may identify a first plurality of particular points on each of the plurality of 3D models. Next, the computing device may identify a second plurality of particular points on a polygonal proxy mesh. Based on the first and second pluralities of particular points, the computing device may resize and reorient each of the plurality of 3D models by associating each of the first plurality of particular points with a corresponding point of the second plurality of particular points.

In other embodiments, the composite mesh may be blended with a reference model.

In other embodiments, the plurality of 3D models is produced through a digital scanning technology from one or more of LIDAR, photogrammetry, hand scanning, turntable scanning, and/or other scanning methods.

The above-mentioned processes as performed by the computing device may also be described explicitly as one or more methods, as well as non-transitory computer-readable media that, when executed by the computing device, cause the device to execute the one or more methods.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

A more complete understanding of the aspects described herein and the advantages thereof may be acquired by referring to the following description in conjunction with the accompanying drawings, in which:

FIG. 12 depicts a 3D character as formed from a composite mesh and a composite texture map according to one or more illustrative aspects described herein;

DETAILED DESCRIPTION

Figure 1:
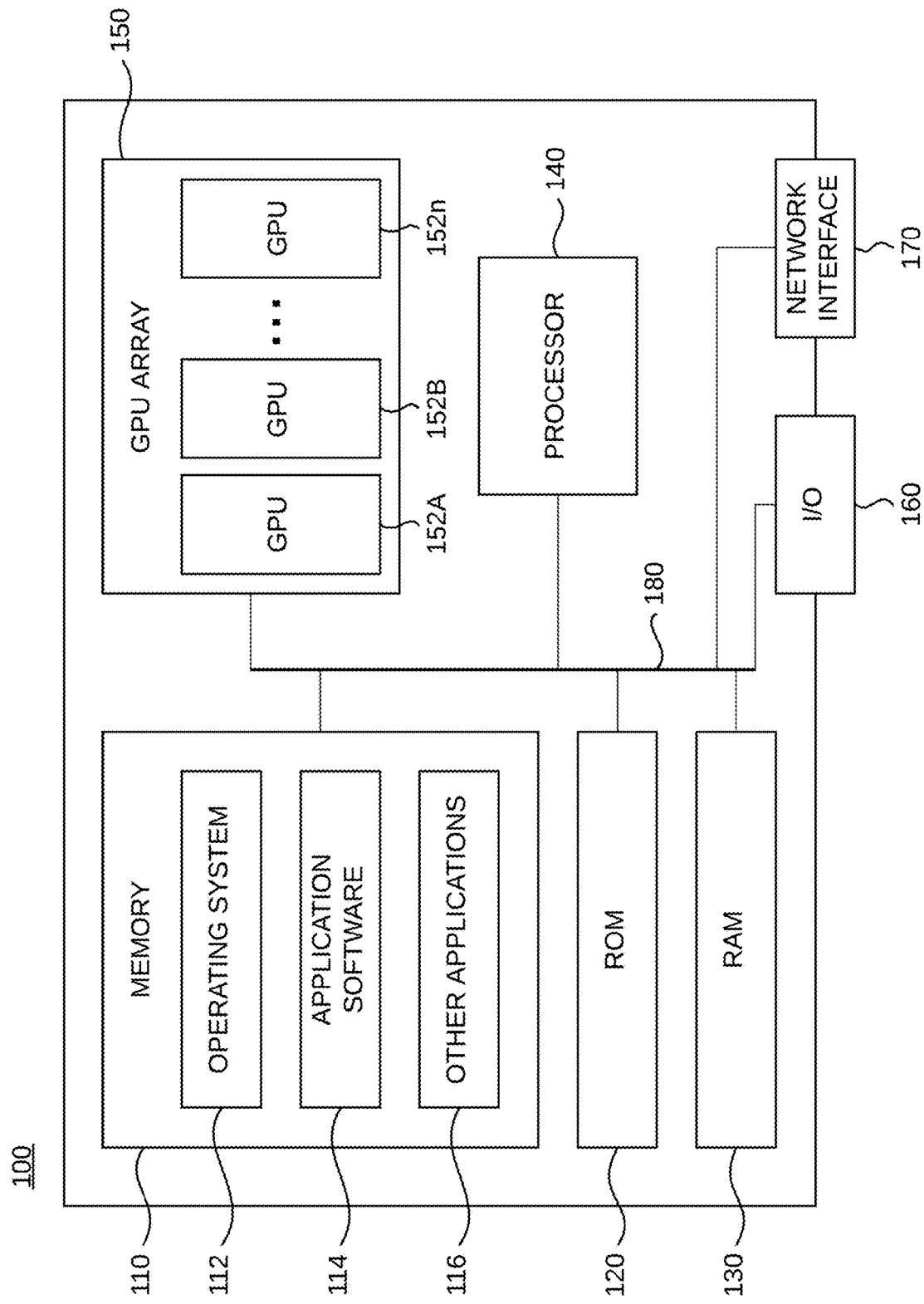
FIG. 1 depicts an exemplary computing device that may be used in one or more illustrative aspects described herein.

In the following description of the various examples and components of this disclosure, reference is made to the accompanying drawings, which form a part hereof, and in which are shown by way of illustration various example structures and environments in which aspects of the disclosure may be practiced. It is to be understood that other structures and environments may be utilized and that structural and functional modifications may be made from the specifically described structures and methods without departing from the scope of the present disclosure. As used herein, the term "exemplary" means illustrative in nature, or as an example, and should not be construed to mean "best" or "ideal".

As a general introduction to the subject matter described in greater detail below, aspects provided herein are directed to three-dimensional (3D) characters and methods for rapidly generating 3D characters from a plurality of 3D source models.

In creating the 3D characters, 3D models may be created and/or acquired. In some instances, the 3D models may be of humans or other fauna and/or flora. Alternatively, the 3D models may be of realistic mythical, fantasy, or alien creatures. The 3D models may be formed by digital sculpting methods, and/or through one or more scanning technologies. The 3D models may be standardized by being scaled and reoriented to a consistent size and orientation. The standardized 3D models may then be applied to a base mesh having material IDs assigned to areas corresponding to particular features through a shrink-wrapping process. By doing so, the material IDs of the base mesh may become associated with like features on the standardized 3D models. The resultant shrink-wrapped 3D models may subsequently be used to generate both composite meshes and texture maps that are unique from those of any of the 3D models.

To generate the composite meshes, collections of shrink-wrapped 3D models may be associated with particular features as originally defined by the material IDs of the base mesh. For example, a first collection of shrink-wrapped 3D models may be associated with a first particular feature, a second collection of shrink-wrapped 3D models may be associated with a second particular feature, a third collection of shrink-wrapped 3D models may be associated with a third particular feature, and so on, until each particular feature corresponding to each of the material IDs originally defined on the base mesh has been associated with a collection of shrink-wrapped 3D models. Then, for each shrink-wrapped 3D model in each collection, the feature corresponding to the material ID to which the collection of 3D models was assigned may be isolated and extracted from the remaining portions of the 3D model not corresponding to the material ID. As such, the first particular feature of each of the first collection of shrink-wrapped 3D models may be isolated and extracted from the remaining features, the second particular feature of each of the second collection of shrink-wrapped 3D models may be isolated and extracted from the remaining features, the third particular feature of each the third collection of shrink-wrapped 3D models may be isolated and extracted from the remaining features, and so on, such that each particular feature has been removed from the greater mesh construct. The isolated features may then be assembled to create a composite mesh. The composite mesh, for example, may be composed of the first feature from a first shrink-wrapped scan in the first collection, the second feature from a first shrink-wrapped scan in the second collection, the third feature from a first shrink-wrapped scan in the third collection, and so on. In this way, the composite mesh is formed from the extracted features from disparate shrink-wrapped 3D models based on the material IDs as originally defined on the base mesh.

Similarly, in generating the composite texture maps, collections of shrink-wrapped 3D models may be associated with particular features as originally defined by the material IDs of the base mesh in the manner described above. Instead of isolating the mesh corresponding to the assigned features, however, texture map feature selections for each of the assigned features may be isolated and extracted. These extracted texture map feature selections may be assembled together on a feature-by-feature basis to generate a composite texture map. As with the composite meshes, the composite texture maps can be generated from texture map feature selections corresponding to particular features from disparate shrink-wrapped 3D models.

Once formed, the composite meshes and texture maps may be combined to form unique, 3D characters unlike any one particular 3D model from which feature meshes and/or texture map feature selections were extracted. Accordingly, highly detailed and unique 3D characters can be formed from the combination of disparate mesh and texture map extracts from a variety of 3D source models.

In order to ensure the uniqueness of the 3D characters from the 3D source models, as well as from other 3D characters created in a batch and/or previous batches, machine learning algorithms may be executed on the generated 3D characters to compare the characters against the 3D source models and other generated meshes. A threshold may be used for determining sufficient uniqueness such that 3D characters over the uniqueness threshold are persisted and designated for production and characters under the threshold are discarded.

Additionally, the 3D characters may be accentuated by the addition of discrete features and accessories to further the creation of a production quality characters.

In some instances, character attributes such as age, gender, and/or ethnicity may be factored into the creation of 3D characters through the methods provided herein. To do so, shrink-wrapped 3D models and/or collections of shrink-wrapped 3D models may be filtered by age, gender, and/or ethnicity of the originating source model and then associated with particular features as defined by the material IDs of the base mesh. Thus, during the generation of composite meshes and texture maps, the resultant composite meshes and texture maps will be composed of features and texture map feature selections from shrink-wrapped 3D models of the desired age, gender, and/or ethnicity. Additionally and/or alternatively, one or more exemplary shrink-wrapped 3D models and/or collections of shrink-wrapped 3D models of a particular age, gender, and/or ethnicity may be used to smooth the generated composite meshes and/or composite texture maps to attain feature and/or texture similarity with the one or more exemplary shrink-wrapped 3D models and/or collections of shrink-wrapped 3D models.

Through the processes described generally above and in a more detailed manner below, unique 3D characters can be created programmatically and at scale from a limited quantity of 3D source models. In particular, by leveraging techniques including, but not limited to, 3D model standardization, material ID assignments, shrink-wrapping, and mesh/texture isolation and extraction, disparate feature meshes and texture maps can be removed from 3D models in a spatially and dimensionally consistent manner, and subsequently reassembled in a 3D character while maintaining the spatial and dimensional consistency. Doing so not only allows for unique characters to be created, but also from limited data sets. For example, in the event that there are five 3D source models, on the order of 1,500 sufficiently differentiated and unique 3D characters may be able to be created. Accordingly, it should be readily understood that significant technological benefits are provided in comparison with the industry standards for generating unique characters through the implementation of the methods described herein.

Reference is now made to FIG. 1, which depicts an exemplary computing device 100 that may be used in one or more illustrative aspects described herein. In addition to other types of computing devices, computing device 100 may be configured as client computing device 100, server 100, networked computing device 100, remote-access computing device 100, and virtualized computing device 100, and may be used in performing one or more of the illustrative methods described herein, as well as for other computer processes.

Computing device 100 may include memory 110, which may store operating system 112, application software 114, and/or other applications 116. In some instances, additional data and/or programs may be stored in memory 110. Operating system 112 of memory 110 may be a standard computer operating system commonly found on the market, or may be an application-specific operating system designed for computing device 100 in performing the one or more methods described herein. In either case, operating system 112 may consist of executable instructions for the operation of computing device 100. Memory 110 may also include application software 114 which may correspond to one or more of the methods for generating 3D characters from a plurality of 3D source models in the manner provided in this disclosure. Other applications 116 may also be included in memory 110 and may include executable instructions for supporting applications required by application software 114 and/or for general operation of computing device 100 as configured in the ways described herein (e.g., as a server, networked computing device, etc.).

Computing device 100 may further include read-only memory (ROM) 120 and random-access memory (RAM) 130. ROM 120 may be a permanent and non-volatile memory that may store items such as firmware updates for one or more of operating system 112, application software 114, and/or other applications 116. In some instances, ROM 120 may store additional data related to the functionality of computing device 100. RAM 130 may be a nonpermanent and volatile memory and may store short-term data as produced and consumed by one or more of operating system 112, application software 114, and/or other applications 116. In some instances, RAM 130 may be accessed and used by graphical processing unit (GPU) array 150 and/or the GPUs 152A, 152B, and 152n included therein. Furthermore, RAM 130 may be accessed and used by processor 140, input/output (I/O) 160, and/or network interface 170.

Processor 140 may be included in computing device 100. In some instances, processor 140 may be a single processor 140, or a plurality of processors 140, and may perform computer functions based on instructions and/or data stored in memory 110, ROM 120, and/or RAM 130. Processor 140 may have access to, and usage of, one or more of memory 110, ROM 120, RAM 130, GPU array 150 and/or GPUs 152A, 152B, and 152n, I/O 160, and/or network interface 170. Through accessing one or more of GPU array 150, GPUs 152A, 152B, and 152n, I/O 160, and network interface 170, processor 140 may be able to offload processing of computationally complex tasks incurred during the performance of one or more of the methods for generating 3D characters from a plurality of 3D source models as described herein, as well as to receive user and/or external inputs required in performing such tasks.

Computing device 100 may include GPU array 150. In some instances, GPU array 150 may be a hardware device configured to interconnect GPUs 152A, 152B, and 152n and present access to GPUs 152A-152n to processor 140. In other instances, GPU array 150 may be a logical container for GPUs 152A, 152B, and 152n and may expose access to GPUs 152A-152n through a programmatic API for processor 140 as defined by executable instructions in memory 110, ROM 120, and/or RAM 130. Alternatively, GPU array 150 may reflect a hybridized hardware/logical construct.

GPUs 152A, 152B, and 152n may be one or more GPUs and may exist internal or external to GPU array 150 within computing device 100. In some cases, GPUs 152A, 152B, and 152n may constitute an unbounded plurality of GPUs. GPUs 152A, 152B, and 152n may be used by processor 140 during the execution of application software 114 for performance of one or more of the methods for generating 3D characters from a plurality of 3D source models as described herein. Additionally, GPUs 152A, 152B, and 152n may be used by processor 140 in performing other operations of computing device 100.

In some instances, computing device 100 may further include I/O 160 which may allow for communication between computing device 100 and one or more external devices including, but not limited to, a monitor, mouse, keyboard, touchscreen, touchpad, remote, speaker, and the like. Furthermore, computing device 100 may include network interface 170 which may enable computing device 100 to send and receive messages with external computing devices over a network.

System bus 180 may be comprised within computing device 100 and may serve as a channel through which components of computing device 100 may communicate with other components. For example, system bus 180 may enable one or more of processor 140, GPU array 150, and GPUs 152A, 152B, and 152n to communicate with one or more of memory 110, ROM 120, RAM 130, I/O 160, and network interface 170. Furthermore, system bus 180 may enable communications between one or more of processor 140, GPU array 150, and GPUs 152A, 152B, and 152n.

Figure 2:
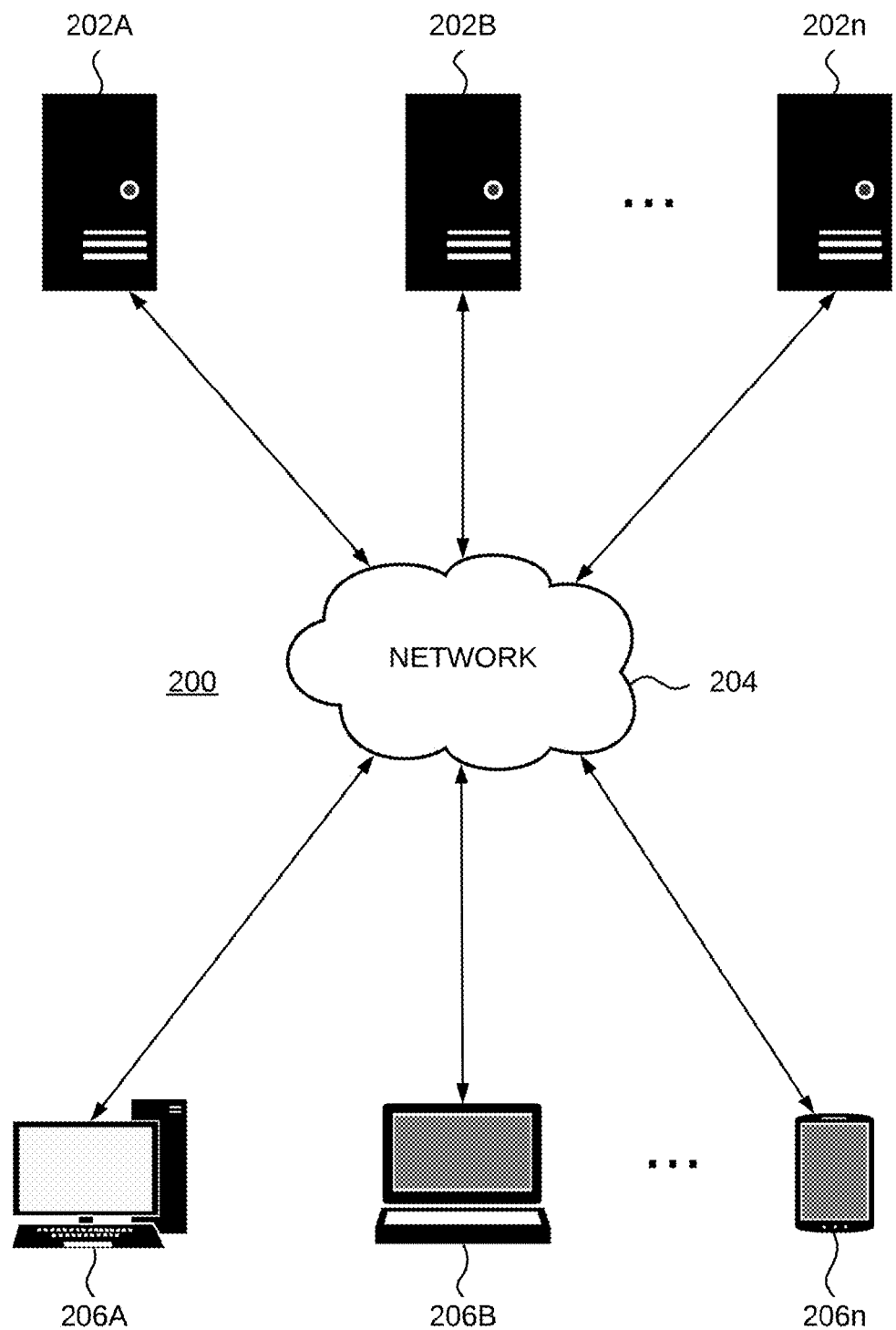
FIG. 2 depicts an exemplary computing system that may be used in one or more illustrative aspects described herein.

FIG. 2 depicts an exemplary computing system 200 that may be used in one or more illustrative aspects described herein. Computing system 200 may include one or more servers 202A, 202B, and 202n, and one or more client devices 206A, 206B, and 206n. In some instances, servers 202A, 202B, and 202n may constitute an unbounded plurality of servers, and client devices 206A, 206B, and 206n may constitute an unbounded plurality of client devices. Each of one or more servers 202A, 202B, and 202n and one or more client devices 206A, 206B, and 206n may be configured to communicate over network 204.

Servers 202A, 202B, and 202n, as well as client devices 206A, 206B, and 206n, may be similar to computing device 100 described in FIG. 1. In some instances, servers 202A, 202B, and 202n may be similar to computing device 100, but configured as servers 202A-202n, remote computing devices 202A-202n, and/or other types of computing devices. Furthermore, client devices 206A, 206B, and 206n may be similar to computing device 100, but configured respectively as desktop computer 206A, laptop computer 206B, and mobile device 206n. Client devices 206A-206n may also be configured as other types of computing devices.

Each of servers 202A, 202B, and 202n and client devices 206A, 206B, and 206n may be configured to perform one or more of the methods for generating 3D characters from a plurality of 3D source models as described herein. For example, in some instances the totality of methods for generating 3D characters from a plurality of 3D source models may be performed on servers 202A, 202B, and 202n. In such instances, the generation of the 3D characters may be commenced either by a job running periodically on servers 202A, 202B, and 202n and/or by a character creation request from one or more of client devices 206A, 206B, and 206n. Generation of 3D characters may also be commenced by a character creation request from a different server from 202A-202n, or a device different from any of server 202A-202n and/or client devices 206A-206n. Alternatively, the totality of methods for generating 3D characters from a plurality of source 3D models may be performed on client devices 206A, 206B, and 206n. In such instances, the generation of the 3D characters may be commenced by a user request provided directly to a particular client device 206A, 206B, and/or 206n.

In some cases, performance of the one or more methods for generating 3D characters from a plurality of 3D source models may be split across servers 202A, 202B, and 202n and client devices 206A, 206B, and 206n. For example, a first portion of methods may be performed at client devices 206A, 206B, and 206n. When complete, a second portion of methods may be performed at servers 202A, 202B, and 202n. In such cases, the performance of the first and second portion of methods may occur consecutively or non-consecutively. For instance, a first method of the first portion of methods may be performed at client devices 206A, 206B, and 206n, a first method of the second portion of methods may be performed at servers 202A, 202B, and 202n, and so on, until the totality of methods in the generation of 3D characters is complete.

In performing one or more of the methods described herein, in addition to other tasks, servers 202A, 202B, and 202n and client devices 206A, 206B, and 206n may communicate through network 204. In some instances, network 204 may be a local-area network (LAN) 204, wide-area network (WAN) 204, or other type of network. Alternatively, network 204 may serve as a virtual private network (VPN) 204 between servers 202A, 202B, and 202n and client devices 206A, 206B, and 206n. In some cases, there may be multiple networks 204 between servers 202A, 202B, and 202n and client devices 206A, 206B, and 206n. For example, a network 204' (not depicted in FIG. 2) may serve as a private network and network 204 may be a public network. Conversely, network 204' may serve as a public network and network 204 may be a private network. In some instances, both networks 204' and 204 may be private or public networks. Furthermore, it should be readily understood that a greater or fewer number of networks may be present without departing from the scope of the disclosure.

Figure 3:
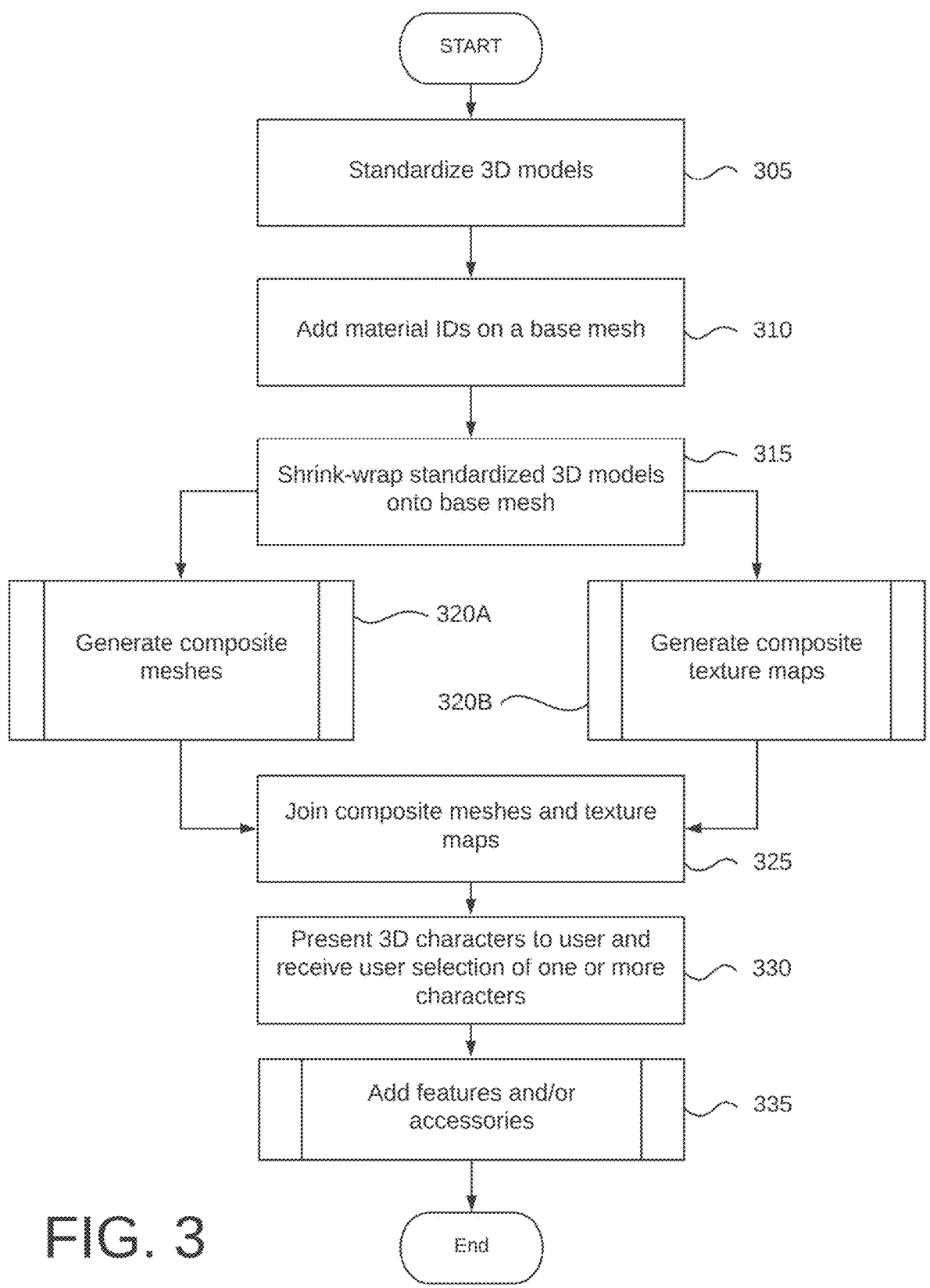
FIG. 3 depicts a method for generating three-dimensional (3D) characters from 3D source models according to one or more illustrative aspects described herein.

Reference is now made to FIG. 3 which depicts a method for generating unique 3D characters from 3D source models according to one or more illustrative aspects described herein. As stated above, the method described in FIG. 3 may be performed by one or more servers and/or one or more client devices such as servers 202A, 202B, and 202n and client devices 206A, 206B, and 206n as described in FIG. 2. Thus, it is to be understood that any of the particular steps of the method of FIG. 3, or of any sub-methods thereof such as those described in FIGS. 4, 5, 6, and 15 may be performed at one or more devices similar to servers 202A, 202B, and 202n and/or one or more device similar to client devices 206A, 206B, and 206n. Furthermore, the events described in regard to FIG. 3, or of any sub-methods thereof such as those described in FIGS. 4, 5, 6, and 15, may be performed in the order depicted and described, or in any other arrangement and/or sequence, at one or more computing devices similar to servers 202A, 202B, and 202n and/or client devices 206A, 206B, and 206n.

At step 305, one or more 3D models may be standardized. The 3D models may be generated through one or more of LIDAR, photogrammetry, hand and/or turntable scanning, as well as through other scanning methods. In some instances, the 3D models may be of one or more resolutions and may be sculpted from scratch and/or from a starting mesh, and/or acquired from third-party sources. In performing the standardization, the one or more 3D models may be resized and/or reoriented to fit a consistent size and/or orientation. In some embodiments, the 3D model standardization process may be performed manually by a user on a client device or on a server through a remote desktop or VPN. Alternatively, the standardization may be performed programmatically using predefined constraints or criteria.

Figure 7B:
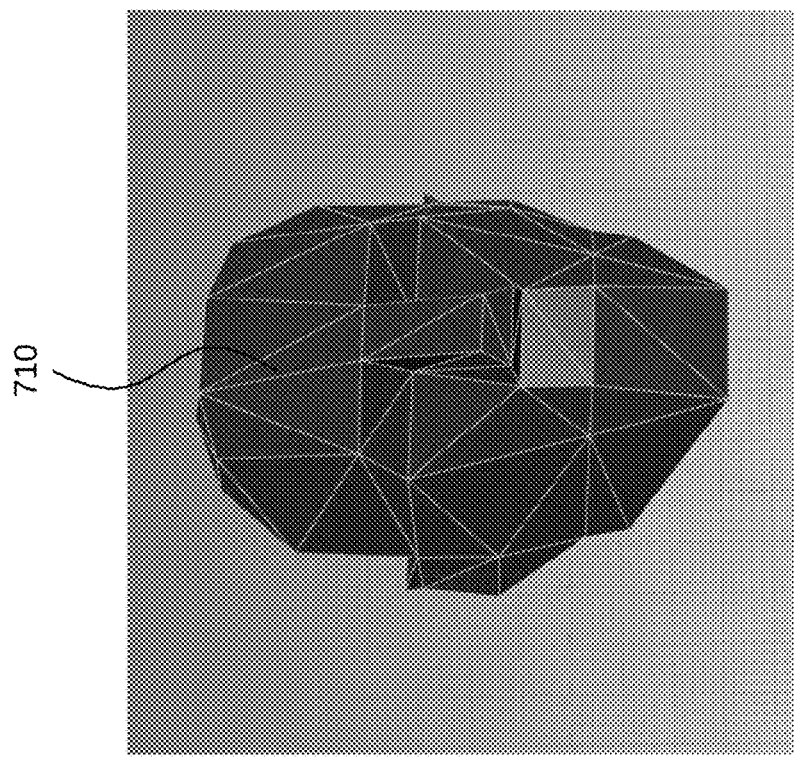
FIGS. 7A, 7B, and 7C respectively depict a 3D model, a polygonal proxy mesh, and a 3D model aligned on a polygonal proxy mesh according to one or more illustrative aspects described herein.
Figure 7A:
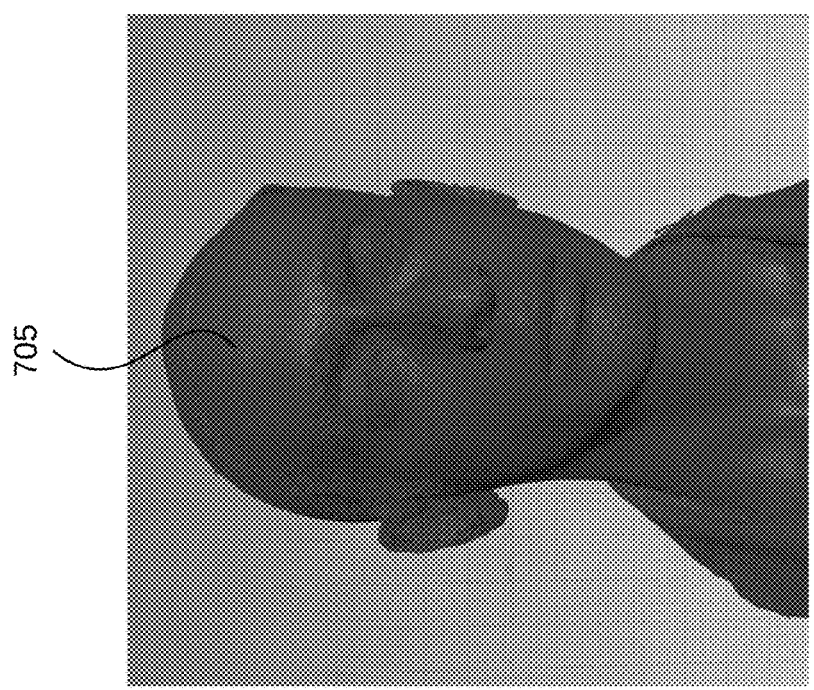
Figure 7C:
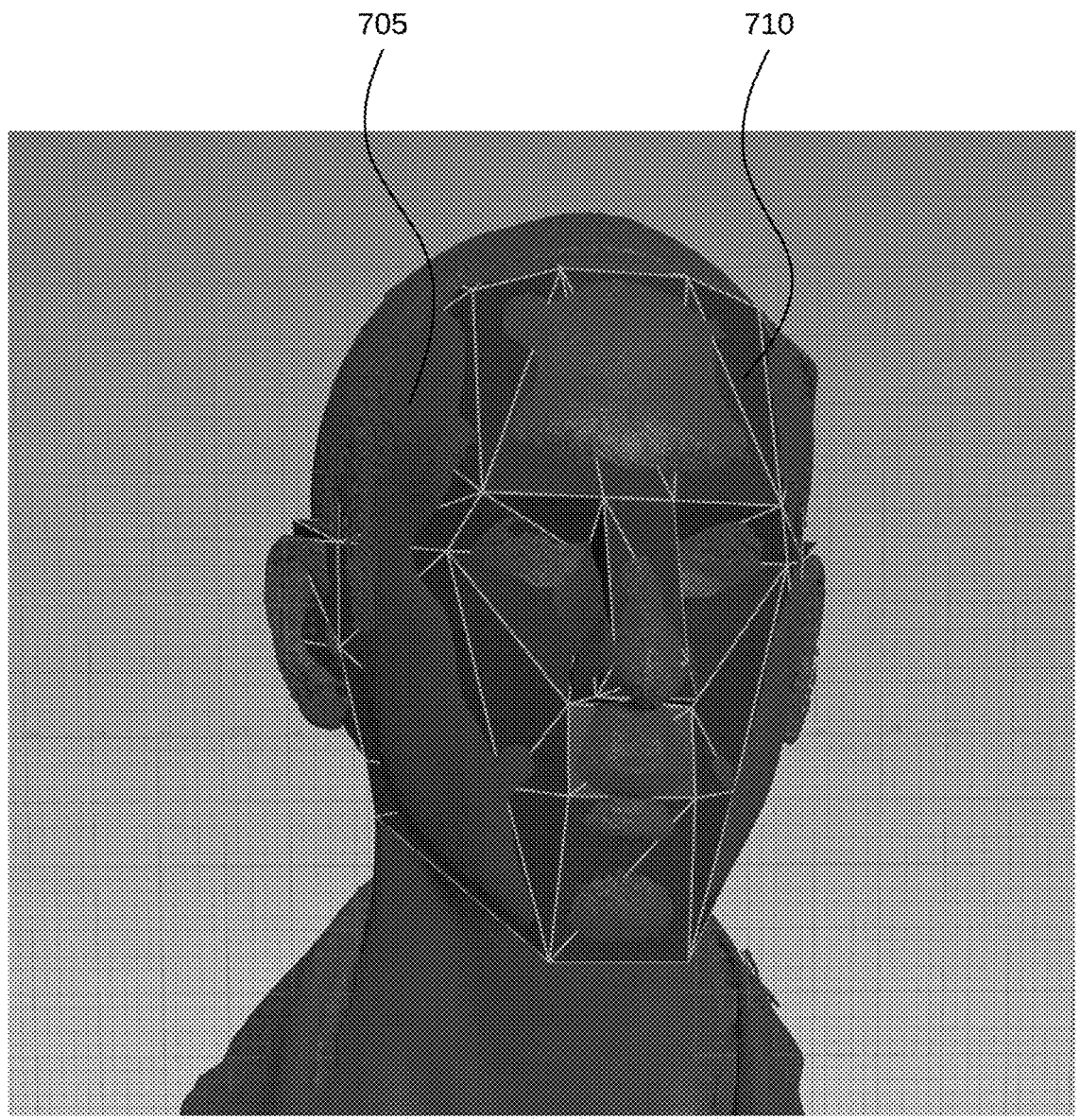

As an illustrative, non-limiting example to further describe the manual standardization process, reference is made to FIGS. 7A, 7B, and 7C, which respectively depict a 3D model, a polygonal proxy mesh, and a 3D model aligned on a polygonal proxy mesh according to one or more aspects described herein. In order to manually standardize a 3D model, such as model 705 in FIG. 7A, a polygonal proxy mesh, such as polygonal proxy mesh 710 in FIG. 7B, may be used. Polygonal proxy mesh 710 may be a collection of plain geometric shapes and may be sized and oriented in a manner consistent with that of a desired output for the standardization process. A user may align model 705 to the standardized size and orientation through alignment of the model 705 with polygonal proxy mesh 710. An example of the resultant of this process is shown in FIG. 7C which depicts model 705 scaled and oriented relative to polygonal proxy mesh 710.

In some instances, the process may be reversed and a user may align polygonal proxy mesh 710 with model 705. In such cases, the size and orientation of polygonal proxy mesh 710 may be adjusted to meet the size and orientation of model 705. After the adjustment of polygonal proxy mesh 710 has been completed, proxy mesh 710 may be linked with model 705 causing model 705 and polygonal proxy mesh 710 to be joined together. A base mesh, as described in further detail below, may also include a polygonal proxy mesh similar to polygonal proxy mesh 710. However, the polygonal proxy mesh of the base mesh may be of a fixed size, location, and orientation corresponding to the size, location, and orientation of the base mesh. The polygonal proxy mesh of the base mesh and polygonal proxy mesh 710 may also be linked. Because of the linkage between the proxy mesh of the base mesh and polygonal proxy mesh 710, during the standardization process the size, location, and orientation of polygonal proxy mesh 710 may transform to match the size, location, and orientation of the polygonal proxy mesh of the base mesh. Due to the linkage of model 705 with polygonal proxy mesh 710, model 705 may also be transformed to become commiserate with the size, location, and orientation of the polygonal proxy mesh of the base mesh. In this way, each of the 3D models may become standardized to a general size, location, and orientation.

As an illustrative, non-limiting example to further describe the programmatic standardization process, one or more first reference points may be defined on the 3D model and/or texture of the 3D model. Similarly, one or more second reference points, correlating to the one or more first reference points of the 3D model, may be defined on a polygonal proxy mesh. In some instances, each of the one or more first and/or second reference points may be material IDs, numerical IDs, multi-dimensional coordinate IDs, and/or selection sets and may be designated at locations such as the left ear canal, leftmost left eye corner, rightmost left eye corner, leftmost right eye corner, rightmost right eye corner, and right ear canal. Alternatively, a fewer or greater number of reference points may be utilized and the points may correspond to key features and/or intersecting points. In some instances, the key features may be key facial features and the intersecting points may be areas where key facial features intersect. It should be understood, however, that other non-facial features and intersecting points may be used to align full-body 3D model with a full-body proxy mesh.

During standardization, the one or more first reference points defined on the 3D model and/or texture of the 3D model may be adjusted to correspond with the one or more second reference points defined on the polygonal proxy mesh. In some instances, "adjusting" may involve one or more of aligning, resizing, reorienting, repositioning, and any other operation involving the positioning of the first reference points to form substantially a same geometry space as the second reference points. In some instances, "same geometry" may mean that the first reference points have a same vector relationship to the corresponding second reference points in a multi-dimensional space at one or more of x, y, and z points in the multi-dimensional space. For example, a first point of the one or more first reference points defined on the 3D model and/or texture of the 3D model may be aligned with a corresponding first point of the one or more second reference points on the polygonal proxy mesh, a second point of the one or more first reference points defined on the 3D model and/or texture of the 3D model may be aligned with a corresponding second point of the one or more second reference points on the polygonal proxy mesh, a third point of the one or more first reference points defined on the 3D model and/or texture of the 3D model may be aligned with a corresponding third point of the one or more second reference points on the polygonal proxy mesh, and so on, such that each of the first particular points on the 3D model are aligned with a corresponding point of the second reference points on the polygonal proxy mesh. After each point on the 3D model has been aligned with the corresponding point on the polygonal proxy mesh, the 3D model is considered standardized to a consistent size and orientation.

In some instances, the 3D model may further be cleaned up to reduce noise in the texture and polygonal layers during the standardization processes. Furthermore, the polygonal count of the 3D model may either be increased or decreased to create a more malleable mesh construct. Additionally and/or alternatively, the 3D model may also be smoothed during the model standardization process.

The standardization processes described above in step 305 of FIG. 3, may be performed for 3D models of varying resolutions relating to a same physical or conceptual model. For example, 3D models of high, medium, and/or low resolutions may be standardized according to the methods described above in step 305. As a result, in some instances, standardized 3D models of high, medium, and/or low resolutions may be created for each physical or conceptual model. As such, a plurality of standardized 3D models may be produced for a same physical or conceptual model, where each of the plurality of standardized 3D models have a different resolution.

Referring back to FIG. 3, at step 310, one or more material IDs may be applied to a base mesh. In some instances, the one or more material IDs may be respectively applied to a plurality of base meshes, each of which having a differing polygonal count. In addition to the commonly known definition in the art, the term "base mesh," as used in the disclosure provided herein, may further correspond to at least a polygonal mesh composed of a finite and fixed amount of consistently numbered polygons that may receive material IDs and be applied to a 3D model. In some instances, the one or more material IDs may further include an alphanumeric ID and/or coordinate ID. Additionally and/or alternatively, the one or more material IDs may relate to a single point and/or polygon on the base mesh, and/or a collection of points and/or polygons on the base mesh. In other instances, a selection set or any other identifier for polygonal collections may be used instead of material IDs.

The one or more material IDs may uniquely demarcate particular points and/or polygons, as well as collections of points and/or polygons, on the base mesh. For instance, a hypothetical base mesh may be composed of 1,000 unique polygons in a multi-dimensional mesh construct. A first material ID may correspond to particular polygons 1 to 200 on the base mesh, a second material ID may correspond to particular polygons 201 to 750 on the base mesh, and a third material ID may correspond to particular polygons 751 to 1,000 on the base mesh. In this way, the material IDs may be used to identify user-specified sets of particular polygons within the total polygonal set of the base mesh.

Figure 8:
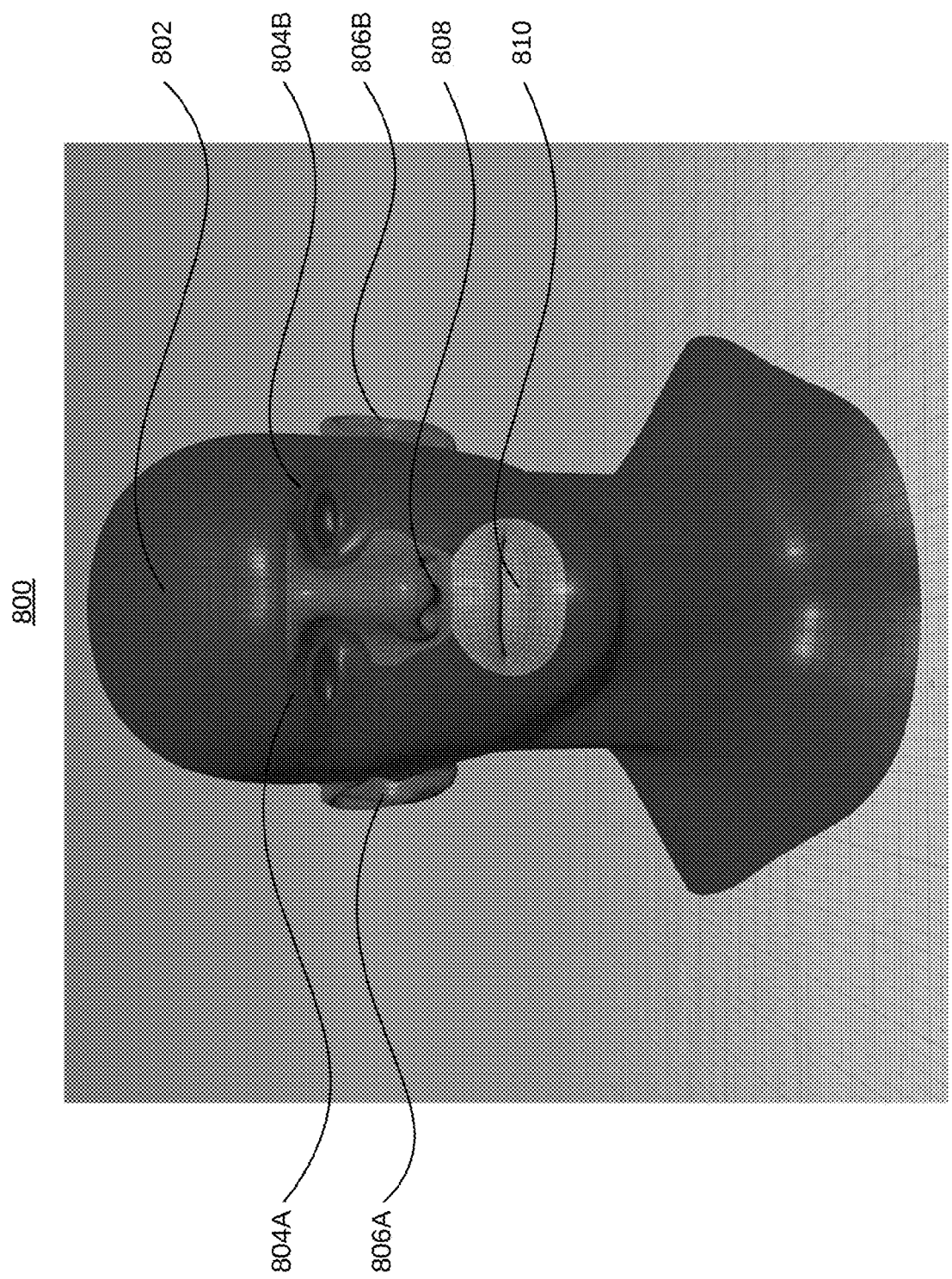
FIG. 8 depicts a base mesh with material ID assignments according to one or more illustrative aspects described herein.

As an illustrative, non-limiting example to further describe adding the material IDs to the base mesh, reference is made to FIG. 8, which depicts a base mesh with material ID assignments according to one or more aspects described herein. Base mesh 800, as shown in FIG. 8, may include one or more material IDs (e.g., material IDs 802, 804A, 804B, 806A, 806B, 808, and 810). Each of material IDs 802, 804A, 804B, 806A, 806B, 808, and 810 may denote a particular feature on base mesh 800. For instance, material ID 802 may denote the head region, material IDs 804A and 804B may respectively denote the right eye region and left eye region (collectively eye regions), material IDs 806A and 806B may respectively denote the right ear region and left ear region (collectively ear regions), material ID 808 may denote the nose region, and material ID 810 may denote the mouth region.

While material IDs 802, 804A, 804B, 806A, 806B, 808, and 810 of base mesh 800 are depicted with particular shapes and polygonal counts and numberings corresponding to the respective regions, it should be understood that changes in shapes and polygonal counts and numberings of the material IDs can be used. Furthermore, while only the head, eye, ear, nose, and mouth regions are shown in FIG. 8, a fewer or greater number of regions and corresponding material IDs can also be used. Also, although FIG. 8 depicts an isolated head as base mesh 800 with material IDs denoting facial features, it is to be understood that a full body base mesh can be used with material IDs denoting particular body parts and/or body features. Such processes as described in regard to human head base mesh 800 may also be used for other naturally occurring fauna and flora, as well as fantasy characters.

Returning to FIG. 3, at step 315, the base mesh with assigned material IDs described at step 310 may be shrink-wrapped to each of the one or more standardized 3D models produced at step 305. In particular, a unique instance of the base mesh with assigned material IDs may be shrink-wrapped to a particular standardized 3D model of the one or more standardized 3D models. Accordingly, a particular unique instance of the base mesh with assigned material IDs may be applied to a particular standardized 3D model for each of the standardized 3D models. Each of the unique instances of the base mesh with assigned material IDs may be identical.

Generally, "shrink-wrapping" may involve conforming one 3D mesh to the shape and form of another 3D mesh. In addition to the general usage of the term, "shrink-wrapping," as used in the disclosure provided herein, may further involve at least wrapping a base mesh over a standardized 3D model, applying the base mesh to the standardized 3D model, and performing a smoothing process to settle base mesh over the standardized 3D model. Through performing the shrink-wrapping process, a base mesh may be applied to each of the one or more standardized 3D models. As such, the base mesh may take the size, shape, and orientation of the standardized 3D models while also retaining the material IDs and corresponding polygonal counts and numberings assigned at step 310. Thus, through the shrink-wrapping processes, the features (e.g., head, ears, eyes, mouth, nose, etc.) of the standardized 3D models may become associated with the material IDs originally defined on the base mesh, as well as the corresponding polygonal counts and numberings which the material IDs denote.

For example, if a hypothetical base mesh is composed of 1,000 unique polygons in a mesh construct with a first material ID corresponding to polygons 1 to 200, a second material ID corresponding to polygons 201 to 750, and a third material ID corresponding to polygons 751 to 1,000, then the shrink-wrapped 3D model may also be composed of 1,000 unique polygons and the material IDs of the shrink-wrapped 3D model may also relate to the same polygonal counts and numberings. Specifically, the first material ID of the shrink-wrapped 3D model may correspond to the same polygons 1 to 200, the second material ID of the shrink-wrapped 3D model may correspond to the same polygons 201 to 750, and the third material ID of the shrink-wrapped 3D model may correspond to the same polygons 751 to 1,000. Accordingly, the material IDs and the polygonal counts and numberings to which the material IDs relate may be directly applied to the 3D model during the shrink-wrapping process.

Figure 9B:
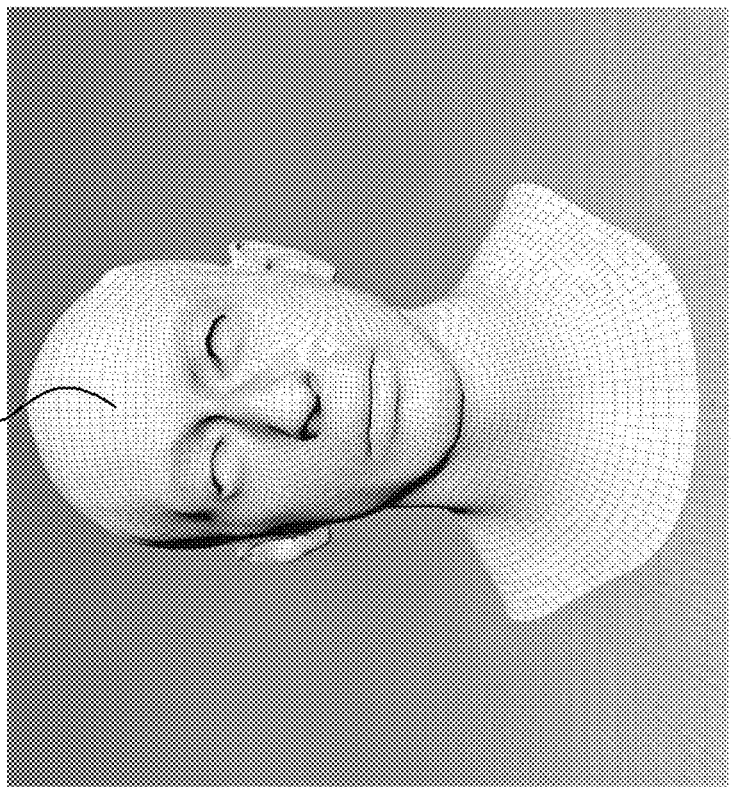
FIGS. 9A and 9B respectively depict a shrink-wrapped high polygonal mesh of a 3D model with material IDs and a shrink-wrapped high polygonal mesh of a 3D model after smoothing according to one or more illustrative aspects described herein.
Figure 9A:
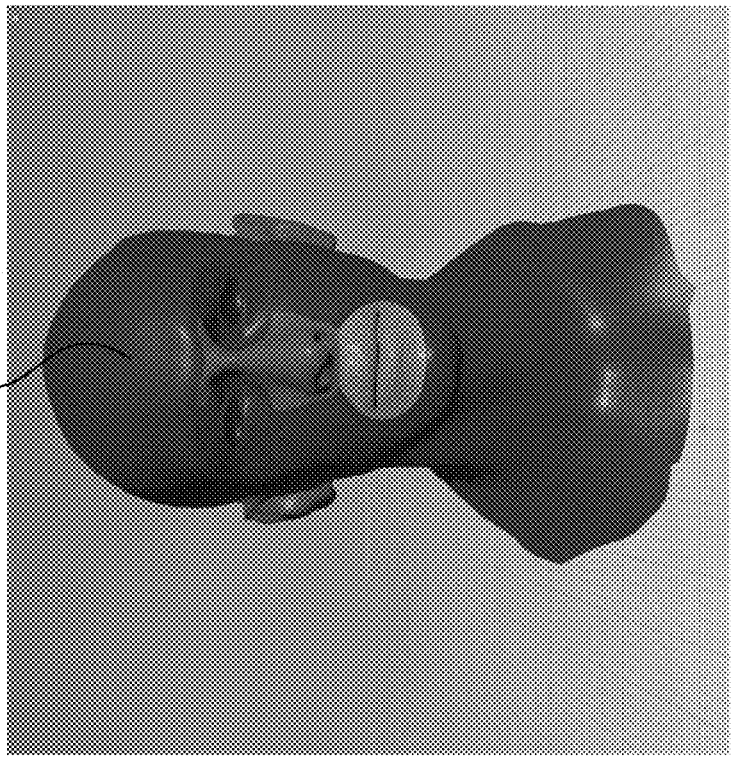

As an illustrative, non-limiting example to further describe shrink-wrapping a base mesh with the one or more standardized 3D models, reference is made to FIGS. 9A and 9B, which respectively depict a shrink-wrapped high polygonal mesh of a 3D model with material IDs and a shrink-wrapped high polygonal mesh of a 3D model after smoothing according to one or more aspects described herein. In FIG. 9A, shrink-wrapped high polygonal mesh 905A is provided which may represent the application of a base mesh to a 3D model. In particular, shrink-wrapped mesh 905A may reflect the resultant of applying base mesh 800 of FIG. 8 to 3D model 705 of FIG. 7A. Due to the shrink-wrapping process, shrink-wrapped high polygonal mesh 905A may comprise the material IDs of base mesh 800 as mapped onto 3D model 705. The material IDs on shrink-wrapped high polygonal mesh 905A may point to the same polygons and number of polygons as those of base mesh 800. In FIG. 9B, shrink-wrapped high polygonal mesh 905B is provided which may also reflect the resultant of applying base mesh 800 to 3D model 705. However, shrink-wrapped mesh 905B may further reflect the resultant mesh after a smoothing process is performed. In relation to shrink-wrapped high polygonal mesh 905A of FIG. 9A, shrink-wrapped mesh 905B of FIG. 9B may have a smoother and more consistent polygonal shape. It should be noted that the material IDs may be retained after the smoothing process, but are visually concealed in FIG. 9B to illustrate the mesh changes incurred during smoothing.

In regard to shrink-wrapped mesh 905B of FIG. 9B, it should be understood that while the base mesh (e.g., base mesh 800) has taken the size, shape, and orientation of the 3D model (e.g., 3D model 705), the polygonal count and the vertex order of the base mesh has not changed through the shrink-wrapping process. Accordingly, as a hypothetical example, if the base mesh had 1,000 polygons before the shrink-wrapping process, the shrink-wrapped 3D model resulting from the shrink-wrapping process will also be comprised of the same 1,000 polygons. Furthermore, the material IDs of the base mesh, and corresponding polygonal counts and numberings which the material IDs denote, will also not change through the shrink-wrapping processes. So, in the hypothetical example, if the base mesh had a first material ID corresponding to polygons 1 to 500 and a second material ID corresponding to polygons 501 to 1,000, the first material ID of the shrink-wrapped 3D model would correspond to the same polygons 1 to 500 and the second material ID of the shrink-wrapped 3D model would correspond to the same polygons 501 to 1,000.

In some instances, in order to link the base mesh to the standardized 3D model, one or more first specific points may be defined on a 3D model, and one or more second specific points may be defined on a base mesh. The one or more first specific points defined on the 3D model may be positioned and oriented with the corresponding one or more second specific points defined on the base mesh. For example, a first point of the one or more first specific points defined on the 3D model may be aligned with a corresponding first point of the one or more second specific points on the base mesh, a second point of the one or more first specific points defined on the 3D model may be aligned with a corresponding second point of the one or more second specific points on the base mesh, a third point of the one or more first specific points defined on the 3D model may be aligned with a corresponding third point of the one or more second specific points on the base mesh, and so on, such that each of the first particular points on the 3D model are aligned with the corresponding second specific points on the base mesh. After each point on the 3D model has been aligned with the corresponding point on the base mesh, the shrink-wrapping process may occur.

The shrink-wrapping processes described above in step 315 of FIG. 3, may be performed for a plurality of standardized 3D models of varying resolutions relating to a same physical or conceptual model. For example, standardized 3D models of one or more of high, medium, and low resolutions may be shrink-wrapped according to the methods described above in step 315.

Additionally and/or alternatively, the shrink-wrapping processes may be performed for a plurality of base meshes of varying polygonal counts. In some instances, standardized 3D models of a single resolution relating to a plurality of physical and/or conceptual models may each be shrink-wrapped a plurality of times to differing base meshes of varying polygonal counts to produce a plurality of shrink-wrapped 3D models of varying polygonal resolutions. In other instances, one or more standardized 3D models of varying resolutions may be shrink-wrapped a plurality of times to differing base meshes of varying polygonal counts to produce a plurality of shrink-wrapped 3D models of varying polygonal resolutions.

As an illustrative, non-limiting example to describe the shrink-wrapping process for a plurality of base meshes of varying polygonal counts, a standardized 3D model may be shrink-wrapped, respectively, to a first base mesh composed of 1,000 unique polygons, a second base mesh composed of 10,000 unique polygons, and a third base mesh composed of 100,000 unique polygons, resulting in three distinct shrink-wrapped 3D models, each of which having differing polygonal counts. In some instances, the shrink-wrapping process may be repeated for standardized 3D models of varying resolutions. As such, a standardized 3D model of a first resolution may be shrink-wrapped, respectively, to a first base mesh composed of 1,000 unique polygons, a second base mesh composed of 10,000 unique polygons, and a third base mesh composed of 100,000 unique polygons, a standardized 3D model of a second resolution may be shrink-wrapped, respectively, to a first base mesh composed of 1,000 unique polygons, a second base mesh composed of 10,000 unique polygons, and a third base mesh composed of 100,000 unique polygons, and so on, resulting in a number of shrink-wrapped 3D models corresponding to the number of base meshes for each standardized 3D model of each resolution.

In cases in which a plurality of standardized 3D models of varying resolutions relating to a same physical or conceptual model have been produced, the shrink-wrapping processes described in step 315 may be initially performed for the lowest resolution standardized 3D model. In doing so, processing time may be minimized during shrink-wrapping.

The method of FIG. 3 may then branch into sub-methods 320A and 320B which may respectively entail generating composite meshes and generating composite texture maps. In some instances, the composite meshes and/or the composite texture maps may be formed from one or more shrink-wrapped 3D models and/or texture maps of one or more shrink-wrapped 3D models. During the performance of sub-methods 320A and 320B, a plurality of composite meshes and composite texture maps may be formed.

Figure 4:
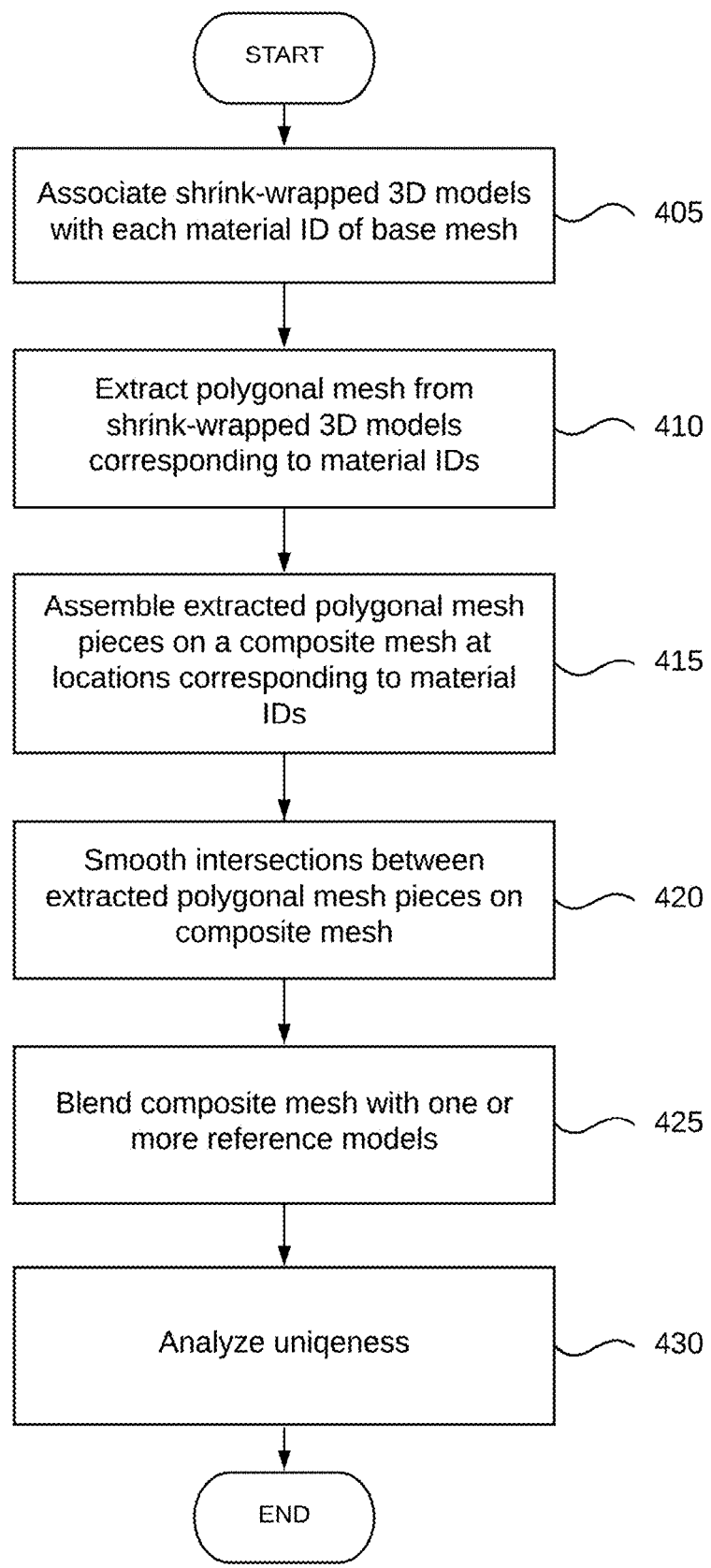
FIG. 4 depicts a method for generating composite meshes from shrink-wrapped 3D models according to one or more illustrative aspects described herein.

In regard to step 320A, reference is made to FIG. 4, which describes step 320A in more detail. In particular, FIG. 4 depicts a method for generating composite meshes from shrink-wrapped 3D models according to one or more illustrative aspects described herein. At step 405, one or more shrink-wrapped 3D models may be associated with each particular material ID as originally defined on the base mesh. For example, one or more shrink-wrapped 3D models may be associated with a first material ID as originally defined on the base mesh, one or more shrink-wrapped 3D models may be associated with a second material ID as originally defined on the base mesh, one or more shrink-wrapped 3D models may be associated with a third material ID as originally defined on the base mesh, and so on, until the totality of material IDs as originally defined on the base mesh are assigned one or more shrink-wrapped 3D models. In some instances, the one or more shrink-wrapped 3D models associated with the material IDs may be called collections of shrink-wrapped 3D models.

Figure 10:
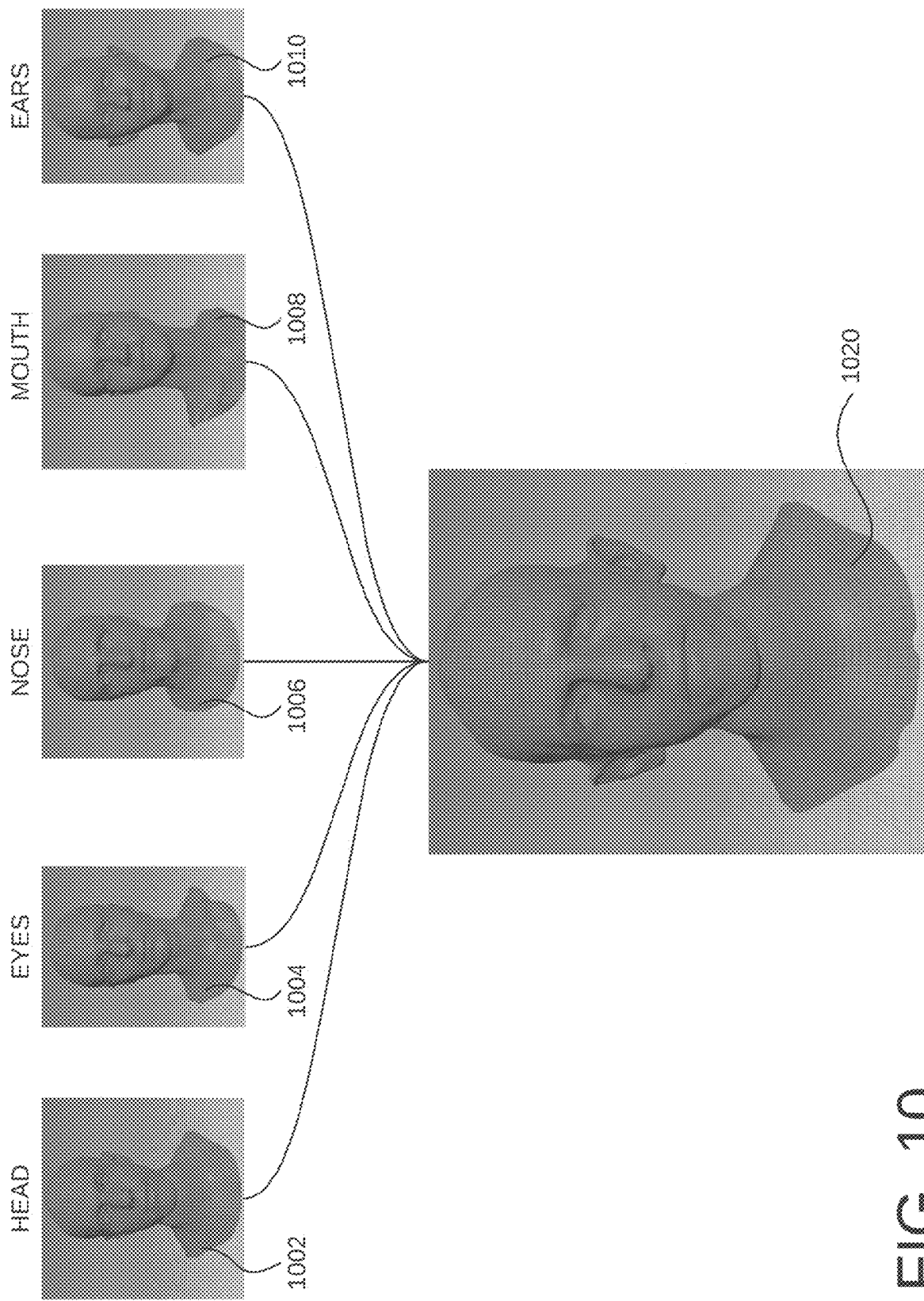
FIG. 10 depicts a composite mesh as formed from components from a plurality of shrink-wrapped 3D models according to one or more illustrative aspects described herein.

As an illustrative, non-limiting example to further describe associating the one or more shrink-wrapped 3D models with each material ID as originally defined on the base mesh, reference is made to FIG. 10, which depicts a composite mesh as formed from components from a plurality of shrink-wrapped 3D models according to one or more aspects described herein. As shown, shrink-wrapped 3D models 1002, 1004, 1006, 1008, and 1010 may be associated with particular material IDs as originally defined on the base mesh. Specifically, shrink-wrapped 3D model 1002 may be associated with a material ID corresponding to the head, shrink-wrapped 3D model 1004 may be associated with a material ID corresponding to the eyes, shrink-wrapped 3D model 1006 may be associated with a material ID corresponding to the nose, shrink-wrapped 3D model 1008 may be associated with a material ID corresponding to the mouth, and shrink-wrapped 3D model 1010 may be associated with a material ID corresponding to the ears. While not depicted, a plurality of shrink-wrapped 3D models may be associated with each material ID as originally defined on the base mesh.

At step 410 of FIG. 4, a polygonal mesh may be extracted from each of the shrink-wrapped 3D models corresponding to the material ID to which the shrink-wrapped 3D models were associated at step 405. The extracted polygonal mesh may be a subset of the total mesh of the shrink-wrapped 3D model and may correspond to the polygons identified by the material ID. As a hypothetical example, if a base mesh was formed from 1,000 polygons, and had a first material ID corresponding to polygons 1 to 500 and a second material ID corresponding to polygons 501 to 1,000, and a first shrink-wrapped 3D model was associated with the first material ID, then polygons 1 to 500 corresponding to the first material ID would be extracted from the total 1,000 polygonal mesh of the first shrink-wrapped 3D model. Similarly, if a second shrink-wrapped 3D model was associated with the second material ID, then polygons 501 to 1,000 corresponding to the second material ID would be extracted from the total 1,000 polygonal mesh of the second shrink-wrapped 3D model. In this way, for each shrink-wrapped 3D model, a polygonal mesh comprising a subset of the totality of polygons of the shrink-wrapped 3D model will be extracted based on the material ID to which the shrink-wrapped 3D model was assigned. In some instances, the extraction process may occur for each shrink-wrapped 3D model of a collection of shrink-wrapped 3D models assigned to each material ID. Accordingly, a plurality polygonal meshes may be extracted for each material ID based on the total number of shrink-wrapped in each collection.

As an illustrative, non-limiting example to further describe extracting the polygonal mesh corresponding to the material ID from the shrink-wrapped 3D model to which the 3D model was assigned, reference is made again to FIG. 10. For each of shrink-wrapped 3D models 1002, 1004, 1006, 1008, and 1010, polygonal mesh pieces may be extracted corresponding to the particular material ID of the base mesh to which each of shrink-wrapped 3D models 1002, 1004, 1006, 1008, and 1010 were assigned. For instance, a polygonal mesh piece corresponding to the material ID for the head region may be extracted from shrink-wrapped mesh 1002, a polygonal mesh piece corresponding to the material ID for the eye region may be extracted from shrink-wrapped mesh 1004, a polygonal mesh piece corresponding to the material ID for the nose region may be extracted from shrink-wrapped mesh 1006, a polygonal mesh piece corresponding to the material ID for the mouth region may be extracted from shrink-wrapped mesh 1008, and a polygonal mesh piece corresponding to the material ID for the ear region may be extracted from shrink-wrapped mesh 1010. It is not required that the extracted polygonal mesh pieces be contiguous. Accordingly, even though features like eyes and ears may not be contiguously defined by the respective material IDs, each of the eyes and ears may be respectively extracted.

In order to further achieve uniqueness in the extracted polygonal pieces, a usage limit can be set for each shrink-wrapped 3D model such that any particular shrink-wrapped 3D model can be used a finite amount of times during extraction of polygonal mesh pieces. For example, a particular shrink-wrapped 3D model may be included in collections of shrink-wrapped 3D models assigned to each of the features corresponding to the material IDs as originally defined on the base mesh. The particular shrink-wrapped 3D model may be associated with a usage limit of two, for example, which causes a maximum of two polygonal mesh pieces to be extracted from the particular shrink-wrapped 3D model. As such, a first polygonal mesh piece and a second polygonal mesh piece may be extracted from the particular shrink-wrapped 3D model, but after that point the particular shrink-wrapped 3D model may be discarded and unable to be used for extraction of a third polygonal mesh piece, fourth polygonal mesh piece, and so on.

In some instances, shrink-wrapped 3D models may be used a plurality of times for a particular feature during extraction of polygonal mesh pieces. For example, a particular shrink-wrapped 3D model may be included in collections of shrink-wrapped 3D models assigned to a first feature corresponding to the material IDs as originally defined on the base mesh. A plurality of instances of polygonal mesh pieces corresponding to the first feature may be extracted from the particular shrink-wrapped 3D model. As such, during composition of the composite mesh, the first polygonal mesh piece from the particular shrink-wrapped 3D model may be found in a plurality of composite meshes. A usage limit may be set so that the particular shrink-wrapped 3D model may be used a finite amount of times when extracting the assigned polygonal mesh piece.

In some embodiments, a left or right-side portion of the polygonal mesh may be extracted from each of the shrink-wrapped 3D models corresponding to the material ID to which the shrink-wrapped 3D models were associated at step 405. The extracted left or right-side portion of the polygonal mesh may be mirrored over a central axis to produce a symmetrical polygonal mesh across from the extracted mesh portion. For example, a left or right-side portion of the polygonal mesh corresponding to the material ID associated with an eye region of a shrink-wrapped 3D model may be extracted. The extracted polygonal mesh corresponding to the left or right-side eye region may then be mirrored across a central axis to produce a symmetrical right or left-side eye region. Similarly, a left or right-side portion of the polygonal mesh corresponding to the material ID associated with an ear region of a shrink-wrapped 3D model may be extracted. The extracted polygonal mesh corresponding to the left or right-side ear region may be mirrored across a central axis to produce a symmetrical right or left-side ear region. Such processes may be repeated for each material ID for each shrink-wrapped 3D model so that symmetrical components are produced at step 410. Alternatively, such processes may be performed for extracted polygonal meshes corresponding to material IDs denoting noncontiguous regions, such as the eye and ear regions, while extracted polygonal meshes corresponding to material IDs denoting contiguous regions, such as the nose, mouth, and head regions, may not receive symmetrical processing.

At step 415 of FIG. 4, the extracted polygonal mesh pieces from each of the shrink-wrapped 3D models may be assembled into a composite mesh. Due to the standardization and shrink-wrapping procedures respectively implemented at steps 305 and 315 of FIG. 3, each of the shrink-wrapped 3D models may be of a same size, shape, location, and orientation, and may have a same polygonal count. Furthermore, the material IDs originally defined on the base mesh may allow for the same collections of polygons to be identified across varying shrink-wrapped 3D models. Thus, when the extracted polygonal mesh pieces from each of the shrink-wrapped 3D models are assembled into a composite mesh, the pieces may maintain the same size, shape, location, orientation, and polygonal count as were previously defined in the shrink-wrapped mesh. In this way, the extracted polygonal mesh pieces can be thought of as modular pieces which can be mixed and matched in a standardized way to create unique 3D characters. Furthermore, by being composed from disparate mesh pieces which in combination form a cohesive mesh of a previously defined size, shape, location, orientation, and same polygonal count, the 3D character may also be of the same size, shape, location, orientation, and same polygonal count.

As an illustrative, non-limiting example to further describe the assembling of extracted polygonal mesh pieces into a composite mesh, reference is returned to FIG. 10. As shown, composite mesh 1020 is formed from the assembly of disparate extracted polygonal meshes from each of shrink-wrapped 3D models 1002, 1004, 1006, 1008, and 1010. In particular, composite mesh 1020 is composed of the extracted mesh piece corresponding to the material ID denoting the head from shrink-wrapped 3D model 1002, the extracted mesh piece corresponding to the material ID denoting the eyes from shrink-wrapped 3D model 1004, the extracted mesh piece corresponding to the material ID denoting the nose from shrink-wrapped 3D model 1006, the extracted mesh piece corresponding to the material ID denoting the mouth from shrink-wrapped 3D model 1008, and the extracted mesh piece corresponding to the material ID denoting the ears from shrink-wrapped 3D model 1010.

The assembling of extracted polygonal mesh pieces into a composite mesh may further be informed by one or more computational nodal structures which guide the assembly of the disparate polygonal mesh pieces into a composite mesh. For example, nodes may be set governing the attachment of extracted polygonal mesh pieces corresponding to the eyes, nose, mouth, and ears, with an extracted polygonal mesh corresponding to the head. The nodes may control how the disparate polygonal mesh pieces are integrated together to form a singular cohesive composite mesh. In total, six nodes may be provided which respectively govern the integration of the polygonal mesh pieces corresponding to the right ear, right eye, nose, mouth, left ear, and left eye with the polygonal mesh piece corresponding to the head. In some instances, a fewer or greater number of nodes may be provided for in governing the attachment of the polygonal mesh pieces with the head.

One or more settings of the nodes may be configured such that a distance searched to find a suitable polygonal attachment interface between the extracted polygonal mesh pieces corresponding to the eyes, nose, mouth, and ears, and the extracted polygonal mesh corresponding to the head is minimized. For example, in integrating an extracted polygonal mesh piece corresponding to the right eye with an extracted polygonal mesh corresponding to the head, the node controlling the attachment of the right eye polygonal mesh piece with the head polygonal mesh piece may search across the head polygonal mesh piece starting at a maximum distance provided for in the one or more nodal settings and work inward to a zero distance space to identify an appropriate polygonal attachment interface on the head polygonal mesh piece for the right eye polygonal mesh piece.

In some instances, the origin of the search may commence from a multi-dimensional point on the head polygonal mesh corresponding to a center position of the material ID matching that of the extracted polygonal mesh piece to be attached. The search, as conducted by the node relating to the specific attachment, may begin at a maximum distance away from the multi-dimensional point defined by the one or more settings of the node. In determining a suitable polygonal attachment interface, the node may start the search at the maximum distance away from the multi-dimensional point, and work inward back to the multi-dimensional point until a polygonal attachment interface is found. After finding the polygonal attachment interface, the node may combine the extracted polygonal mesh piece with the polygonal mesh piece corresponding to the head region.

In some instances, one or more of the disparate polygonal mesh pieces corresponding to each of the features as originally defined on the base mesh may be scaled to better fit the respective areas of insertion. In doing so, a patch may be created that demarcates the area for insertion of an extracted polygonal mesh piece corresponding to a particular feature. The patch may define a center point for the area for insertion, as well as radial distances from the center point to the bounds of the area. The radial distances may be determined across a plurality of axes. Based on the center point and radial distances, the particular polygonal mesh piece to be inserted into the area may be scaled to snap properly into place in accordance with the shape and size of the patch. During the insertion, the ratios of the various polygons forming the extracted polygonal mesh piece may be maintained in order to retain the appearance of the extracted polygonal mesh during the insertion process. In this way, extracted polygonal meshes of varying shapes and sizes can be assembled together in a standardized manner without distorting the appearance of the extracted polygonal meshes.

At step 420 of FIG. 4, the intersections of the extracted polygonal mesh pieces forming the composite mesh may be smoothed to create a more cohesive mesh construct. In some instances, the smoothing may be performed on intersections between extracted polygonal mesh pieces based on predefined numerical adjustments defined on an intersection-by-intersection basis. For example, an intersection between a first extracted polygonal mesh piece and a second extracted polygonal mesh piece may be smoothed according to a first smoothing specifier, an intersection between the second extracted polygonal mesh piece and a third extracted polygonal mesh piece may be smoothed according to a second smoothing specifier, and so on, such that each of the extracted mesh piece intersections are smoothed according to predefined smoothing specifiers. In some instances, each of the predefined smoothing specifiers may be the same across varying intersections between extracted polygonal mesh pieces.

The smoothing process performed at step 420 may occur all at once for all intersections between extracted polygonal mesh pieces on the composite mesh, or may occur in a sequential manner, extracted polygonal mesh piece by extracted polygonal mesh piece, on the composite mesh. In some instances, after the initial smoothing has been performed, the composite mesh may be assessed for mesh artifacts produced during the smoothing process. In the event that mesh artifacts are present on the smoothed composite mesh, the artifacts may be marked for additional smoothing. Similar to the smoothing process performed between the extracted polygonal mesh pieces on the composite mesh, the mesh artifacts may be smoothed in a manner similar to that described in step 420 all at once, or may be smoothed artifact by artifact until all artifacts have been smoothed. By performing an additional smoothing process on any artifacts resulting from the smoothing of the extracted polygonal mesh pieces on the composite mesh, a higher quality resultant composite mesh may be achieved.

At step 425, the composite mesh may be blended with one or more reference models, otherwise known as reference heads, to achieve a subtle likeness between the resultant, blended composite mesh and the one or more reference models. In some instances, the one or more reference models may be 3D scans, shrink-wrapped 3D models, and/or composite meshes. In performing the blending, the disparate polygonal mesh pieces identified by respective material IDs constituting the composite mesh may be blended, adjusted, moved, shaped, or otherwise changed based on one or more corresponding disparate polygonal mesh pieces identified by respective material IDs constituting the reference model. In some instances, the blending of the composite mesh with the reference model may be predicated on one or more parameters of the disparate polygonal mesh pieces of the reference model. One or more parameters including, but not limited to, size, shape, angle, and topography may be identified for each of the one or more polygons comprising the disparate polygonal mesh pieces of the composite mesh and the disparate polygonal mesh pieces of the reference model. During the blending process, the one or more parameters identified for each of the one or more polygons comprising the disparate polygonal mesh pieces of the composite mesh may be adjusted based on the one or more like-parameters identified for each of the one or more like-polygons of the disparate polygonal mesh pieces of the reference model. The blending may be done on a percentage basis on a range between 0% and 100%, where 0% corresponds to no application of the parameter values and 100% corresponds to the full parameter values. To determine a percentage to be used in the blending process, percentages may be predefined for each material ID or a random number generator may be used to produce random percentages for each material ID. In some instances, one or more reference models used in the blending process may be selected based on a particular age, gender, and/or ethnicity of the originating source model in order to align the generated composite mesh with the particular age, gender, and/or ethnicity while also maintaining the underlying mesh characteristics with the generated composite mesh.

Figure 14:
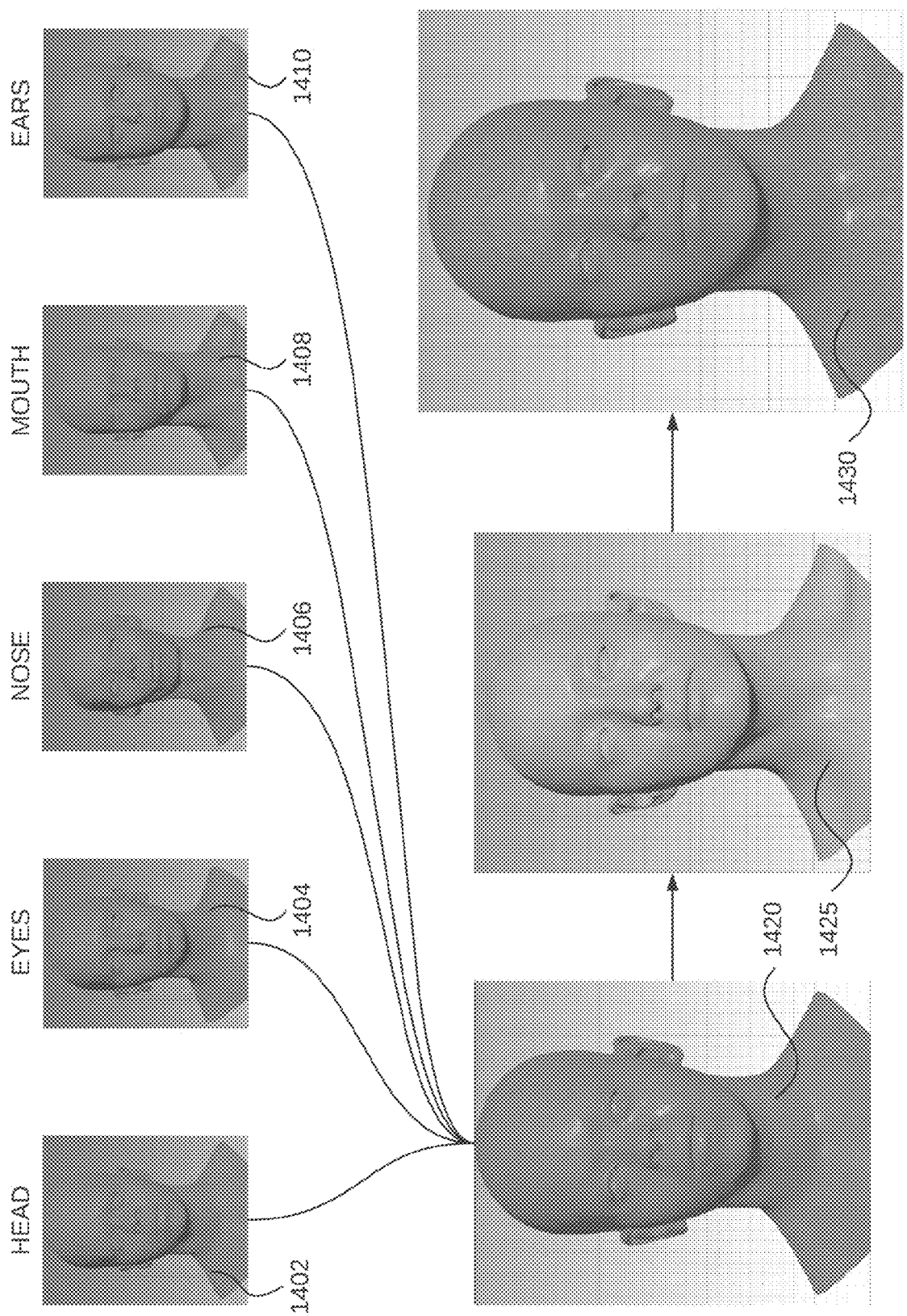
FIG. 14 depicts a composite mesh as formed from components from a plurality of shrink-wrapped 3D models blended relative to a reference model according to one or more illustrative aspects described herein.

As an illustrative, non-limiting example to further describe the usage of a reference model in the blending process, reference is made to FIG. 14, which depicts a composite mesh, as formed from components from a plurality of shrink-wrapped 3D models, blended relative to a reference model according to one or more illustrative aspects described herein. As shown, shrink-wrapped 3D models 1402, 1404, 1406, 1408, and 1410 may be associated with particular material IDs as originally defined on the base mesh. Specifically, shrink-wrapped 3D model 1402 may be associated with a material ID corresponding to the head, shrink-wrapped 3D model 1404 may be associated with a material ID corresponding to the eyes, shrink-wrapped 3D model 1406 may be associated with a material ID corresponding to the nose, shrink-wrapped 3D model 1408 may be associated with a material ID corresponding to the mouth, and shrink-wrapped 3D model 1410 may be associated with a material ID corresponding to the ears.

For each of shrink-wrapped 3D models 1402, 1404, 1406, 1408, and 1410, polygonal mesh pieces may be extracted corresponding to the particular material ID of the base mesh to which each of shrink-wrapped 3D models 1402, 1404, 1406, 1408, and 1410 were assigned. For instance, a polygonal mesh piece corresponding to the material ID for the head region may be extracted from shrink-wrapped mesh 1402, a polygonal mesh piece corresponding to the material ID for the eye region may be extracted from shrink-wrapped mesh 1404, a polygonal mesh piece corresponding to the material ID for the nose region may be extracted from shrink-wrapped mesh 1406, a polygonal mesh piece corresponding to the material ID for the mouth region may be extracted from shrink-wrapped mesh 1408, and a polygonal mesh piece corresponding to the material ID for the ear region may be extracted from shrink-wrapped mesh 1410. Composite mesh 1420 may be formed from the assembly of disparate extracted polygonal meshes from each of shrink-wrapped 3D models 1402, 1404, 1406, 1408, and 1410

Composite mesh 1420 may be may be blended with reference model 1425 to produce blended composite mesh 1430. In particular, the extracted mesh piece corresponding to the material ID denoting the head from shrink-wrapped 3D model 1402 as assembled on composite mesh 1420 may be blended with a corresponding polygonal mesh piece denoted by the same material ID from the reference model 1425, the extracted mesh piece corresponding to the material ID denoting the eyes from shrink-wrapped 3D model 1404 as assembled on composite mesh 1420 may be blended with a corresponding polygonal mesh piece denoted by the same material ID from the reference model 1425, the extracted mesh piece corresponding to the material ID denoting the nose from shrink-wrapped 3D model 1406 as assembled on composite mesh 1420 may be blended with a corresponding polygonal mesh piece denoted by the same material ID from the reference model 1425, the extracted mesh piece corresponding to the material ID denoting the mouth from shrink-wrapped 3D model 1408 as assembled on composite mesh 1420 may be blended with a corresponding polygonal mesh piece denoted by the same material ID from the reference model 1425, and the extracted mesh piece corresponding to the material ID denoting the ears from shrink-wrapped 3D model 1410 as assembled on composite mesh 1420 may be blended with a corresponding polygonal mesh piece denoted by the same material ID from the reference model 1425. The blending between composite mesh 1420 and reference model 1425 may yield blended, composite mesh 1430, which retains similarities to both composite mesh 1420 and reference model 1425.

In some instances, the one or more 3D scans, shrink-wrapped 3D models, and/or composite meshes serving as reference models may be deconstructed into polygonal mesh pieces corresponding to the material ID assignments as defined on the base mesh. The blending may then be performed between each of the polygons of the extracted polygonal mesh pieces from the one or more reference models in relation to each of the polygons of the extracted polygonal mesh pieces of the composite mesh.

In some embodiments, the reference model-based blending process may involve a plurality of reference models, wherein one or more reference models may be assigned to each material ID as defined on the base mesh. In such cases, the blending process between the polygons of extracted polygonal mesh pieces on the composite mesh may begin at a first material ID from the collection material IDs as defined on the base mesh. Before blending is performed at the polygons of the extracted polygonal mesh piece defined by the first material ID on the composite mesh, a reference model may be randomly chosen from the one or more reference models associated with the first material ID. After choosing a reference model from the one or more reference models, a polygonal mesh piece corresponding to the first material ID may be extracted from the chosen reference model. A random value governing the blending on the composite mesh based on the extracted polygonal mesh piece from the reference model may be determined, and the blending on the composite mesh at the each of the polygons of the extracted polygonal mesh piece defined by the first material ID may be performed. After blending is completed at the polygons of the extracted polygonal mesh piece corresponding to the first material ID, the blending process may proceed in the manner described above for the second material ID, third material ID, and so on, until blending has occurred at each polygon of each extracted polygonal mesh piece on the composite mesh.

Alternatively, rather than randomly choosing a reference model at each material ID, a reference model may be pre-selected for each material ID. For example, a first reference model may be pre-selected governing blending of the polygons of the extracted polygonal mesh piece corresponding to the first material ID of the composite mesh with the polygons of the extracted polygonal mesh piece of the pre-selected reference model for the first material ID, a second reference model may be pre-selected governing blending of the polygons of the extracted polygonal mesh piece corresponding to the second material ID of the composite mesh with the polygons of the extracted polygonal mesh piece of the pre-selected reference model for the second material ID, and so on, such that each reference model used in the blending process has been pre-selected rather than randomly selected.

At step 430 of FIG. 4, the composite meshes may be analyzed for uniqueness. In particular, one or more machine learning algorithms may be used to compare each of the composite meshes to one or more of the 3D models, other composite meshes produced in the batch, previously produced 3D characters, and/or other digital figures to generate a uniqueness value for the immediately produced composite meshes. Based on a comparison with a uniqueness threshold, the uniqueness value produced through the machine learning algorithms may be used to determine whether or not each of the immediately produced composite meshes are sufficiently unique. For example, the uniqueness threshold may be an arbitrary value, such as 85. After execution of machine learning algorithms for a first composite mesh, a uniqueness value of 81 may be generated. Given that 81 is less than 85, when the uniqueness value of the composite mesh is compared with the uniqueness threshold, the composite mesh may be determined not to be sufficiently unique. As such, the composite mesh may be removed from the collection of sufficiently unique meshes and will not receive further processing in the method of FIG. 3. Conversely, after execution of machine learning algorithms for a second composite mesh, a uniqueness value of 93 may be generated. Given that 83 is greater than 85, when the uniqueness value of the composite mesh is compared with the uniqueness threshold, the composite mesh may be determined to be sufficiently unique. As such, the second composite mesh may be added to the collection of sufficiently unique composite meshes and may receive further processing.

In embodiments in which a plurality of shrink-wrapped 3D models of varying resolutions are produced for each discrete physical and/or conceptual model through varying resolution standardized 3D models produced at step 305, shrink-wrapped models of varying polygonal counts produced at step 315, and/or a combination thereof, the processes described in step 320A of FIG. 3, and steps 405-430 of FIG. 4, may be performed for each shrink-wrapped 3D model of the varying resolutions. In such cases, composite meshes may be formed of varying resolutions corresponding to the shrink-wrapped 3D models of varying resolutions. Alternatively, the processes described in step 320A of FIG. 3, and steps 405-430 of FIG. 4, may be initially performed for the lowest resolution shrink-wrapped 3D model in order to decrease processing time.

Figure 5:
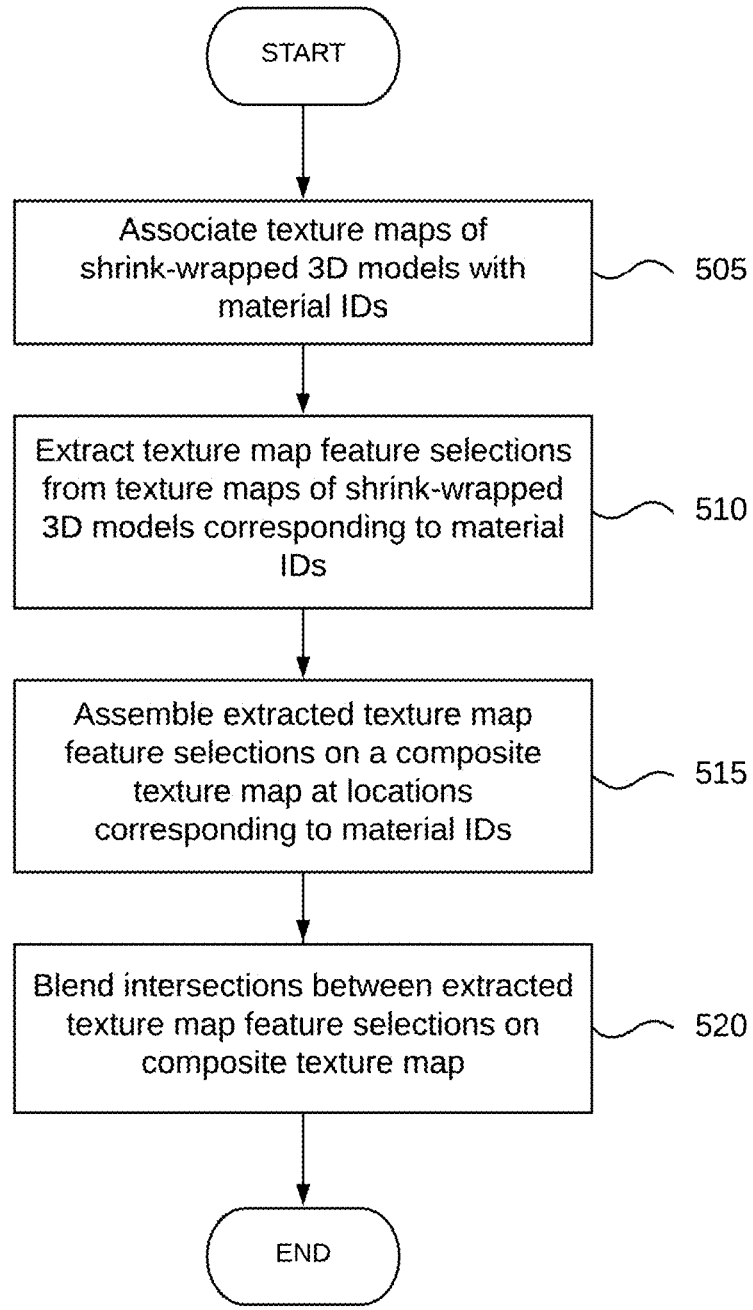
FIG. 5 depicts a method for generating composite texture maps from shrink-wrapped 3D models according to one or more illustrative aspects described herein.

In regard to step 320B of FIG. 3, reference is made to FIG. 5, which describes step 320B in more detail. In particular, FIG. 5 depicts a method for generating composite texture maps from shrink-wrapped 3D models. At step 505, texture maps of one or more shrink-wrapped 3D models may be associated with each particular material ID as originally defined on the base mesh. For example, texture maps of one or more shrink-wrapped 3D models may be associated with a first material ID as originally defined on the base mesh, texture maps of one or more shrink-wrapped 3D models may be associated with a second material ID as originally defined on the base mesh, texture maps of one or more shrink-wrapped 3D models may be associated with a third material ID as originally defined on the base mesh, and so on, until the totality of material IDs as originally defined on the base mesh may be assigned texture maps of one or more shrink-wrapped 3D models.

Alternatively, one or more shrink-wrapped 3D models may be associated with each particular material ID as originally defined on the base mesh. For example, one or more shrink-wrapped 3D models may be associated with a first material ID as originally defined on the base mesh, one or more shrink-wrapped 3D models may be associated with a second material ID as originally defined on the base mesh, one or more shrink-wrapped 3D models may be associated with a third material ID as originally defined on the base mesh, and so on, until the totality of material IDs as originally defined on the base mesh may be assigned one or more shrink-wrapped 3D models. This process may be similar to that of step 405 described above in regard to FIG. 4. As such, performance of steps 405 and 505 may be combined in certain instances in which both the polygonal mesh pieces and texture map feature selections for the assigned shrink-wrapped 3D models are to be extracted. In such instances, the texture maps corresponding to shrink-wrapped 3D models may be unwrapped from the shrink-wrapped scan to isolate the texture map in its entirety.

In some instances, a different base mesh than that used for extracting the polygonal mesh pieces may be used in aiding the extraction of texture map feature selections. In such instances, the different base mesh may be known as a texture map base mesh, and the other base mesh used for extracting the polygonal meshes may be known as a feature base mesh. The texture map base mesh may have a fewer or greater number of material IDs that those of the feature base mesh. As such, in situations in which the texture map base mesh is implemented for extracting texture map feature selections from shrink-wrapped 3D models, steps 305, 310, and 315 described in FIG. 3 may be performed in order to generate standardized shrink-wrapped 3D models with material ID assignments for aiding in texture map feature selection extraction. The other steps described in FIG. 3 may be performed as well.

In other instances, different material ID assignments than those used for extracting the polygonal mesh pieces may be assigned to the same base mesh used in the polygonal mesh extraction process to aid in the extraction of the texture map feature selections. For example, a greater of fewer number of material IDs than those used for extracting the polygonal mesh pieces may be assigned to the base mesh. Additionally and/or alternatively, one or more selection sets, vertices, points, coordinate points, and the like may be identified on the same base mesh to aid in the extraction of texture map feature selections.

Figure 11:
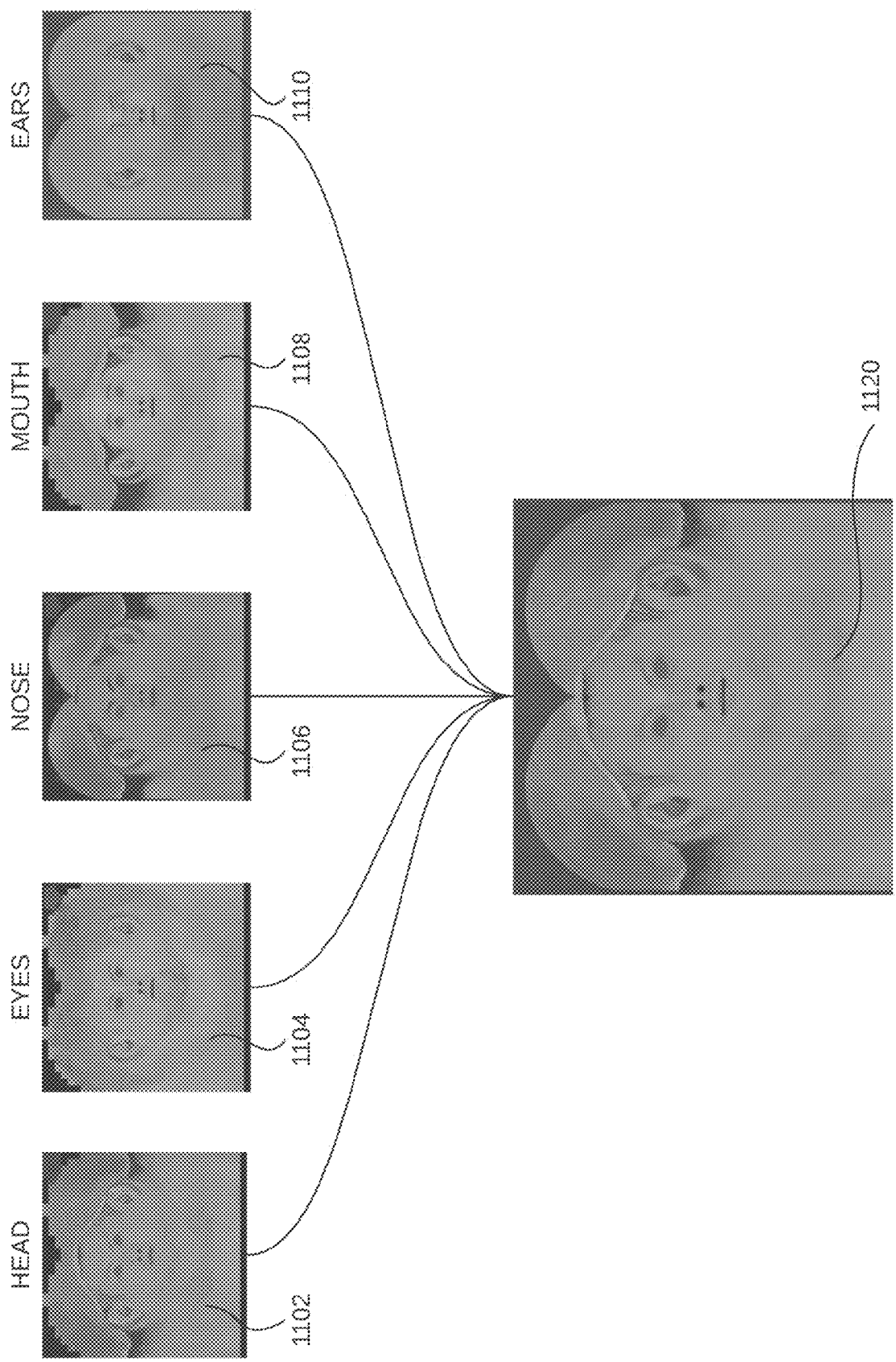
FIG. 11 depicts a composite texture map as formed from texture map feature selections from a plurality of shrink-wrapped 3D models according to one or more illustrative aspects described herein.

As an illustrative, non-limiting example to further describe associating texture maps with each material ID as originally defined on the base mesh, reference is made to FIG. 11, which depicts a composite texture map as formed from texture map feature selections from a plurality of texture maps of one or more shrink-wrapped 3D models according to one or more aspects described herein. As shown, texture maps 1102, 1104, 1106, 1108, and 1110 may be associated with particular material IDs originally defined on the base mesh. Specifically, texture map 1102 may be associated with a material ID corresponding to the head, texture map 1104 may be associated with a material ID corresponding to the eyes, texture map 1106 may be associated with a material ID corresponding to the nose, texture map 1108 may be associated with a material ID corresponding to the mouth, and texture map 1110 may be associated with a material ID corresponding to the ears. While not depicted, a plurality of texture maps may be associated with each material ID as originally defined on the base mesh.

At step 510 of FIG. 5, a texture map feature selection may be extracted from each of the texture maps corresponding to the material ID to which the texture maps were associated at step 505. The extracted texture map feature selections may be a subset of the total texture map and may correspond to the polygons identified by the material ID. As a hypothetical example, if a base mesh was formed from 1,000 polygons, and had a first material ID corresponding to polygons 1 to 500 and a second material ID corresponding to polygons 501 to 1,000, and a first shrink-wrapped 3D model was associated with the first material ID in the extraction process, then a texture map feature selection denoted by polygons 1 to 500 corresponding to the first material ID would be extracted from the total texture map of the first shrink-wrapped 3D model. Similarly, if a second shrink-wrapped 3D model was associated with the second material ID, then a texture map feature selection demarcated by polygons 501 to 1,000 corresponding to the second material ID would be extracted from the total texture map of the second shrink-wrapped 3D model. In this way, for each shrink-wrapped 3D model, a texture map feature selection of a subset of the total texture map of the shrink-wrapped 3D model will be extracted based on the material ID to which the shrink-wrapped 3D model was assigned. In some instances, the extraction process may occur for each shrink-wrapped 3D model of a collection of shrink-wrapped 3D models assigned to each material ID.

As an illustrative, non-limiting example to further describe extracting texture map feature selections corresponding to the material IDs to which the texture map feature selections were assigned, reference is made again to FIG. 11. For each of texture maps 1102, 1104, 1106, 1108, and 1110, a texture map feature selection may be extracted corresponding to the particular material ID originally defined on the base mesh to which each of texture maps 1102, 1104, 1106, 1108, and 1110 were assigned. For instance, a texture map feature selection corresponding to the material ID for the head region may be extracted from texture map 1102, a texture map feature selection corresponding to the material ID for the eye region may be extracted from texture map 1104, a texture map feature selection corresponding to the material ID for the nose region may be extracted from texture map 1106, a texture map feature selection corresponding to the material ID for the mouth region may be extracted from texture map 1108, and a texture map feature selection corresponding to the material ID for the ear region may be extracted from texture map 1110. It is not required that the extracted texture map feature selection be contiguous. Accordingly, even though features like eyes and ears may not be contiguously defined by the respective material IDs, a texture map feature selection for each of the eyes and ears may be extracted.

In order to further achieve uniqueness in the extracted texture map feature selections, a usage limit can be set for each texture map and corresponding shrink-wrapped 3D model such that any particular texture map and corresponding shrink-wrapped 3D model can be used a finite amount of times during extraction of texture map feature selections. For example, a particular texture map may be included in collections of texture maps assigned to each of the features corresponding to the material IDs as originally defined on the base mesh. The particular texture map may be associated with a usage limit of two, for example, which causes a maximum of two texture map feature selections to be extracted from the particular texture map. As such, a first texture map feature selection and a second texture map feature selection may be extracted from the particular texture map, but after that point the particular texture map and corresponding shrink-wrapped 3D model may be discarded and unable to be used for extraction of a third texture map feature selection, fourth texture map feature selection, and so on.

In some instances, texture maps and corresponding shrink-wrapped 3D models may be used a plurality of times for a particular feature during extraction of texture map feature selections. For example, a particular texture map may be included in collections of texture maps assigned to a first feature corresponding to the material IDs as originally defined on the base mesh. A plurality of instances of texture map selections corresponding to the first feature may be extracted from the particular feature map. As such, during composition of the composite texture maps, the first texture map feature selection from the particular texture map may be found in a plurality of composite texture maps. A usage limit may be set so that the particular texture map may be used a finite amount of times when extracting the assigned texture map feature selection.

At step 515, the texture map feature selections extracted from the texture maps of the shrink-wrapped 3D models may be assembled into a composite texture map. Due to the standardization and shrink-wrapping procedures respectively implemented at steps 305 and 315 of FIG. 3, each of the shrink-wrapped 3D models may be of a same size, shape, location, and orientation, and may have a same polygonal count. Furthermore, the material IDs of the base mesh may allow for the same collections of polygons to be identified across varying shrink-wrapped 3D models. Thus, when the extracted texture map feature selections from the texture maps of the shrink-wrapped 3D models are assembled into a composite texture map, the feature selections may maintain the same size, shape, location, orientation, and polygonal count as were previously defined on the shrink-wrapped mesh. Accordingly, the extracted texture map feature selections can be thought of as modular pieces which can be mixed and matched in a standardized way to create unique composite textures. Furthermore, by being composed from disparate texture map feature selections that, in combination, form a cohesive texture map of a previously defined size, shape, location, orientation, and same polygonal count, the composite texture map may also be of the same size, shape, location, orientation, and same polygonal count.

As an illustrative, non-limiting example to further describe the assembling of extracted texture map feature selections into a composite texture map, reference is returned to FIG. 11. As shown, composite texture map 1120 is formed from the assembly of disparate extracted texture map feature selections from each of texture maps 1102, 1104, 1106, 1108, and 1110. In particular, composite texture map 1120 is composed of the extracted texture map corresponding to the material ID denoting the head from texture map 1102, the extracted texture map corresponding to the material ID denoting the eyes from texture map 1004, the extracted texture map corresponding to the material ID denoting the nose from texture map 1106, the extracted texture map corresponding to the material ID denoting the mouth from texture map 1108, and the extracted texture map corresponding to the material ID denoting the ears from texture map 1110.

At step 520, the intersections of the extracted texture map feature selections forming the composite texture map may be blended to create a more cohesive texture. In some instances, the blending may be performed relative to predefined numerical adjustments on an intersection-by-intersection basis. For example, an intersection between a first extracted texture map feature selection and a second extracted texture map feature selection may be blended according to a first blending specifier, an intersection between the second extracted texture map feature selection and a third extracted texture map feature selection may be blended according to a second blending specifier, and so on, such that each of the texture map intersections are blended according to predefined blending specifiers. In other instances, a single predefined blending specifier may be used for each of the intersections between texture map feature selections.

Alternatively, the blending between the intersections of extracted texture map feature selections may be performed in relation to the texture maps of one or more shrink-wrapped 3D models. For example, one or more texture maps of shrink-wrapped 3D models may be associated with each intersection between disparate texture map feature selections as defined by the respective material IDs of the extracted texture map feature selections. Based on the material ID assignments, one or more intersection edges may be determined for the intersection boundary between adjacent texture map feature selections. Texture parameters may be identified for each of the one or more intersection edges between adjacent texture map feature selections. During the blending process, the texture parameters may be used to blend the corresponding texture maps on the composite mesh. In some instances, the blending performed relative to the texture parameters may be done on a percentage basis on a range between 0% and 100%, where 0% corresponds to no application of the texture parameter values and 100% corresponds to the full texture parameter values.

In some instances, the blending of the texture map feature selections may occur before the feature selections are assembled into a composite texture map. For instance, edge portions of the texture map feature selections may be blended and/or blurred based on one or more blending specifiers in a similar manner to that described above. After edge blending, the texture feature selections may be stacked on top of each other to create a composite texture map.

In embodiments in which a plurality of shrink-wrapped 3D models of varying resolutions are produced for each discrete physical and/or conceptual model through varying resolution standardized 3D models produced at step 305, shrink-wrapped models of varying polygonal counts produced at step 315, and/or a combination thereof, the processes described in step 320B of FIG. 3, and steps 505-520 of FIG. 5, may be performed for each shrink-wrapped 3D model of the varying resolutions. In such cases, composite texture maps may be formed of varying resolutions corresponding to the shrink-wrapped 3D models of varying resolutions. Alternatively, the processes described in step 320B of FIG. 3, and steps 505-520 of FIG. 5, may be initially performed for the lowest resolution shrink-wrapped 3D model in order to decrease processing time.

Additionally and/or alternatively, the processes described in step 320B of FIG. 3, and steps 505-520 of FIG. 5 in regard to texture maps may be performed for one or more other maps including, but not limited to, displacement, color, specular, roughness, normal, thickness, and occlusion maps.

Returning to FIG. 3, after completion of steps 320A and 320B, step 325 may be performed and the composite meshes generated at step 320A may be joined with the texture maps generated at step 320B. In particular, each composite mesh may be combined with each composite texture map to create a plurality of 3D characters. For example, in the event that 1,500 composite meshes and 1,500 composite texture maps were generated, each of the composite meshes could be associated with each of the composite texture maps leading to the creation of 2,250,000 3D characters. Stated differently, each of the 1,500 composite meshes may be combined with each of the 1,500 composite texture maps such that any given composite mesh may be composed with any of 1,500 different textures.

As an illustrative, non-limiting example to further describe the joining of composite meshes and composite texture maps into 3D characters, reference is made to FIG. 12, which depicts a 3D character as formed from a composite mesh and a composite texture map. In particular, FIG. 12 depicts composite mesh 1020, which may be similar to composite mesh 1020 of FIG. 10, composite texture map 1120, which may be similar to composite texture map 1120 of FIG. 11, and 3D character 1220, which may be the resultant of joining composite mesh 1020 with composite texture map 1120. As shown, 3D character 1220 may have the same shape, size, orientation, and structure as composite mesh 1020. Additionally, 3D character 1220 may have the same texture aspects as composite texture 1120. By dynamically generating composite meshes and composite texture maps from 3D source models and combining each of the produced composite meshes and composite texture maps, a multitude unique 3D characters can be created.

In embodiments in which a plurality of composite meshes and/or composite texture maps of varying resolutions are produced in steps 320A and 320B, the processes described in step 325 of FIG. 3 may be performed for each of the composite meshes and/or composite texture maps of the varying resolutions. In instances in which both composite meshes and composite texture maps of varying resolutions have been produced, the composite meshes and composite texture maps may be joined based on sharing a like resolution. For example, a first composite mesh of a first resolution may be joined with a first composite texture map of the first resolution, a second composite mesh of a second resolution may be joined with a second composite texture map of the second solution, and so on. Alternatively, the composite meshes and composite texture maps may be joined regardless of resolution and each composite mesh may be joined with each composite texture map. In instances in which only composite meshes of varying resolutions have been produced, each of the composite meshes may be joined with the composite texture map of a singular resolution. Similarly, in instances in which only composite texture maps of varying resolutions have been produced, each of the composite texture maps may be joined with the composite mesh of a singular resolution.

At step 330, the 3D characters may be presented to an end user via a user interface device. In instances in which the 3D characters are of varying resolutions, each 3D character regardless of resolution may be presented to the end user. In some cases, however, a lowest resolution 3D character may be presented to the user. In such cases, non-lowest resolution 3D characters may or may not be created during a first iteration of the method described in FIG. 3. For example, at step 305, standardized 3D models may be produced at high, medium, and low resolutions. At steps subsequent to step 305, the low-resolution standardized 3D model may receive further processing (e.g., through steps 310, 315, 320A, 320B, and 325) while the medium and high-resolution standardized 3D models may remain unprocessed. Accordingly, at step 330, the 3D characters presented to the end user may each be of low-resolution. The end user may then be prompted to select one or more low-resolution 3D characters so that the medium and/or high-resolution standardized 3D models produced at step 305 can receive further processing (e.g., through steps 310, 315, 320A, 320B, and 325). By processing the medium and/or high-resolution standardized 3D models after an explicit request by an end user, processing time may be decreased by initially processing low-resolution standardized 3D models and subsequently performing processing on medium and/or high-resolution standardized 3D models upon user request.

It should be understood that the point of demarcation where medium and/or high-resolution cease being processed without explicit request by the end user may occur at any point in the method described in FIG. 3. For example, processing of medium and/or high-resolution standardized 3D models may cease after material IDs are added on a base mesh at step 310, after shrink-wrapping onto the base mesh at step 315, after generating the composite mesh at step 320A, or after generating composite texture maps at step 320B.

At step 335, each of the 3D characters produced at step 325 may receive further processing to add additional features and/or accessories. Features such as eyes, teeth, hair, and the like, as well as accessories such as eye glasses, hats, clothing, jewelry, weapons, armor, and the like, may be added to the 3D character in order to increase the character's visual uniqueness. In some instances, 3D characters selected by the end user at step 330 may receive further processing to add additional features and/or accessories. In such instances, each of the resolutions of the 3D character may receive further processing to add additional features and/or accessories, or the highest quality resolution of the 3D character may receive further processing.

Figure 6:
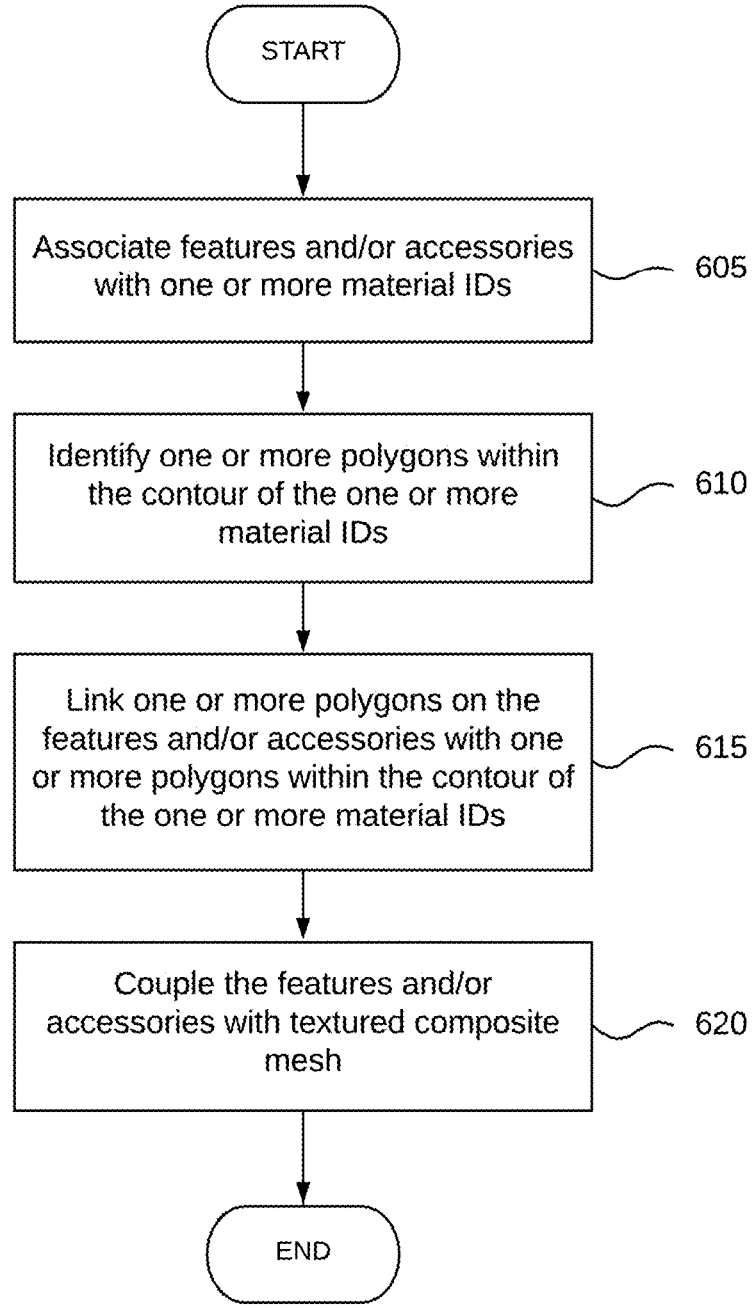
FIG. 6 depicts a method for adding accessories to a 3D character according to one or more illustrative aspects described herein.

In further regard to step 335, reference is made to FIG. 6, which describes the method of adding features and/or accessories to a 3D character according to one or more aspects of the disclosure. At step 605, features and/or accessories may be associated with one or more material IDs on the 3D character. For instance, a feature and/or accessory may be associated with one or more material IDs on the 3D character corresponding to areas which will broadly be connected to, and/or contacted with, the feature and/or accessory. In the case of an eye feature, the eye may be associated with a material ID corresponding to the eye region of the 3D character. Similarly, in the case of a head hair feature, the head hair may be associated with the material ID corresponding to the head region on the 3D character. Furthermore, in the case of a pair of glasses, the glasses may be associated with material IDs corresponding to the ear regions, head region, and nose region on the 3D character. Such associations between feature and/or accessory with one or more material IDs of a 3D character may occur for other features and/or accessories in addition to those explicitly mentioned herein.

At step 610, one or more polygons may be identified within the contour of the one or more material IDs on the 3D character. In particular, the one or more polygons within the contour of the one or more material IDs on the 3D character may be identified corresponding to attachment and/or interface points between the 3D character and feature and/or accessory. In the case of an eye feature, one or more polygons within the contour of the material ID corresponding to the eye region of the 3D character may be identified to facilitate addition of eye features. Similarly, in the case of a head hair feature, one or more polygons within the contour of the material ID corresponding to the head region on the 3D character may be identified to facilitate the addition of hair features. Furthermore, in the case of a pair of glasses, one or more polygons within the contour of the material IDs corresponding to the ear regions, head region, and nose region on the 3D character may be identified to facilitate the addition of a glasses accessory. Additionally and/or alternatively, one or more selection sets, vertices, points, coordinate points, and the like may be identified within the contour of the one or more material IDs on the 3D character instead of, or in addition to, polygons.

Figure 13A:
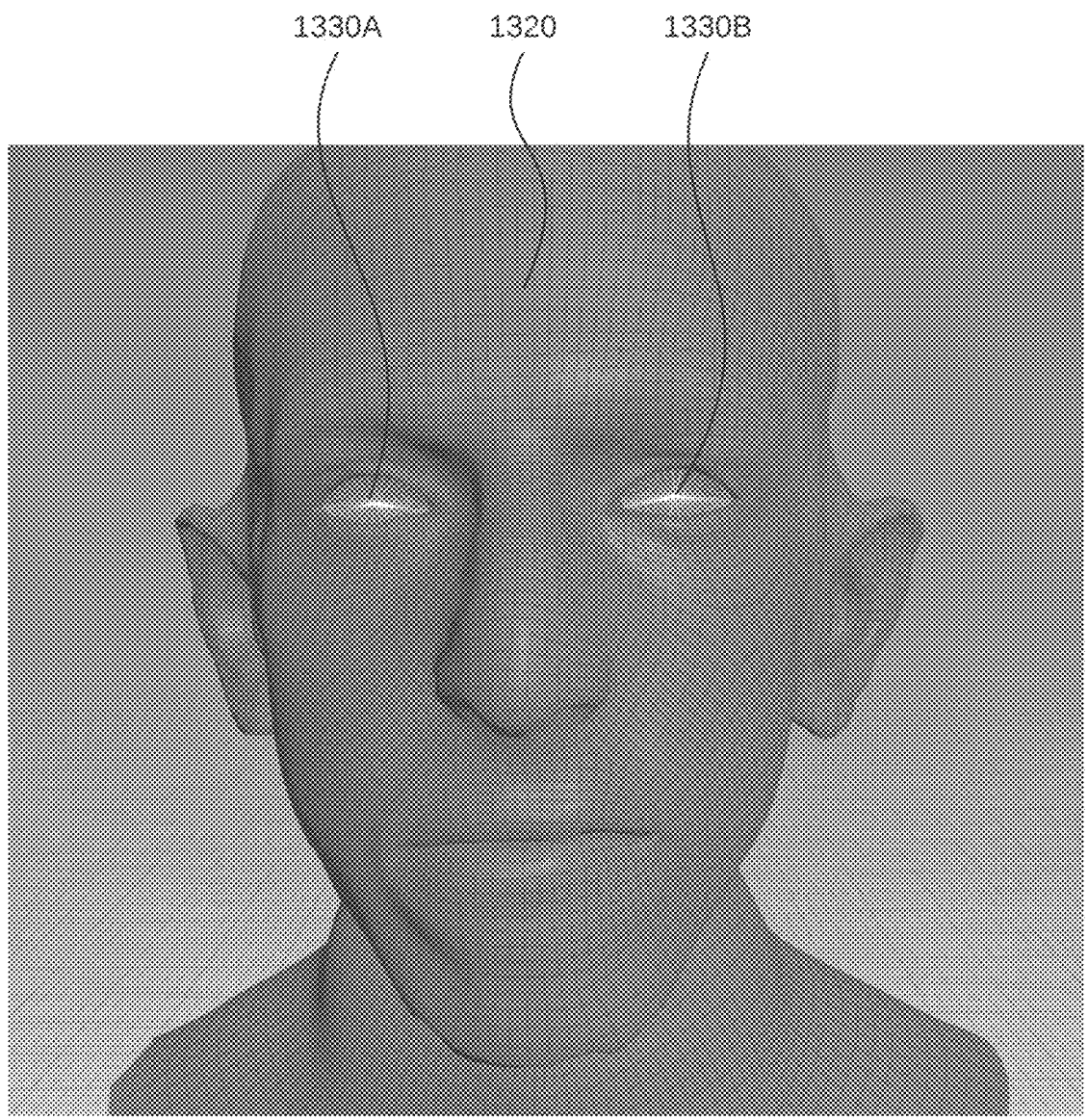
FIGS. 13A and 13B respectively depict a 3D character with polygons identified for feature insertion and a 3D character with feature insertion according to one or more illustrative aspects described herein.

As an illustrative, non-limiting example to further describe adding an exemplary feature to a 3D character, reference is made to FIG. 13A, which depicts a 3D character with polygons identified for feature insertion according to one or more illustrative aspects described herein. In FIG. 13A, composite mesh 1320 is shown. In some instances, composite mesh 1320 may be 3D character 1320 and may include a texture map as produced by sub-method 320B described in detail in FIG. 5. One or more polygons 1330A and 1330B may be identified within the contour of the material ID corresponding to the eye region of composite mesh 1320. The one or more polygons 1330A and 1330B may located at positions such that when one or more features, such as eyes, are inserted into composite mesh 1320, the features are appropriately joined with composite mesh 1320.

At step 615, one or more polygons on the feature and/or accessory may be linked with one or more polygons within the counter of the one or more material IDs. The linkage may associate polygons on the feature and/or accessory with polygons on the 3D character that will be contacting after the application of the feature and/or accessory to the 3D character at the region denoted by the one or more material IDs. For example, in the case of an eye feature, one or more polygons of the eye feature may be linked with one or more polygons comprised within the material ID corresponding to the eye region of the 3D character. Similarly, in the case of a head hair feature, one or more polygons of the hair feature may be linked with one or more polygons comprised within the material ID corresponding to the head region of the 3D character. Furthermore, in the case of a pair of glasses, one or more polygons of the glasses accessory may be linked with one or more polygons within the contour of each of the material IDs. For instance, one or more polygons on the earpiece/temple tip sections of the glasses may be linked with one or more polygons within the material ID corresponding to the ear regions, one or more polygons on the temple portions of the glasses may be linked with one or more polygons within the material ID corresponding to the head region, and one or more polygons of the bridge region of the glasses may be linked with one or more polygons within the material ID corresponding to the nose region of the 3D character. Additionally and/or alternatively, one or more selection sets, vertices, points, coordinate points, and the like of the feature and/or accessory may be linked one or more selection sets, vertices, points, coordinate points, and the like of the 3D character.

At step 620, the one or more linked polygons on the feature and/or accessory may be coupled with the one or more polygons within the one or more material IDs of the 3D character. By coupling the one or more linked polygons on the feature and/or accessory with the one or more polygons within the one or more material IDs of the 3D character, the feature and/or accessory may become componentized onto the 3D character. For example, in the case of an eye feature, one or more polygons of the eye feature may be coupled with one or more polygons comprised within the material ID corresponding to the eye region of the 3D character. Similarly, in the case of a head hair feature, one or more polygons of the hair feature may be coupled with one or more polygons comprised within the material ID corresponding to the head region of the 3D character. Furthermore, in the case of a pair of glasses, one or more polygons of the glasses accessory may be coupled with one or more polygons within the contour of each of the material IDs of the 3D character. For instance, one or more polygons on the earpiece/temple tip sections of the glasses may be coupled with one or more polygons within the material ID corresponding to the ear regions, one or more polygons on the temple portions of the glasses may be coupled with one or more polygons within the material ID corresponding to the head region, and one or more polygons of the bridge region of the glasses may be coupled with one or more polygons within the material ID corresponding to the nose region of the 3D character. Additionally and/or alternatively, one or more selection sets, vertices, points, coordinate points, and the like of the feature and/or accessory may be coupled one or more selection sets, vertices, points, coordinate points, and the like of the 3D character.

Figure 13B:
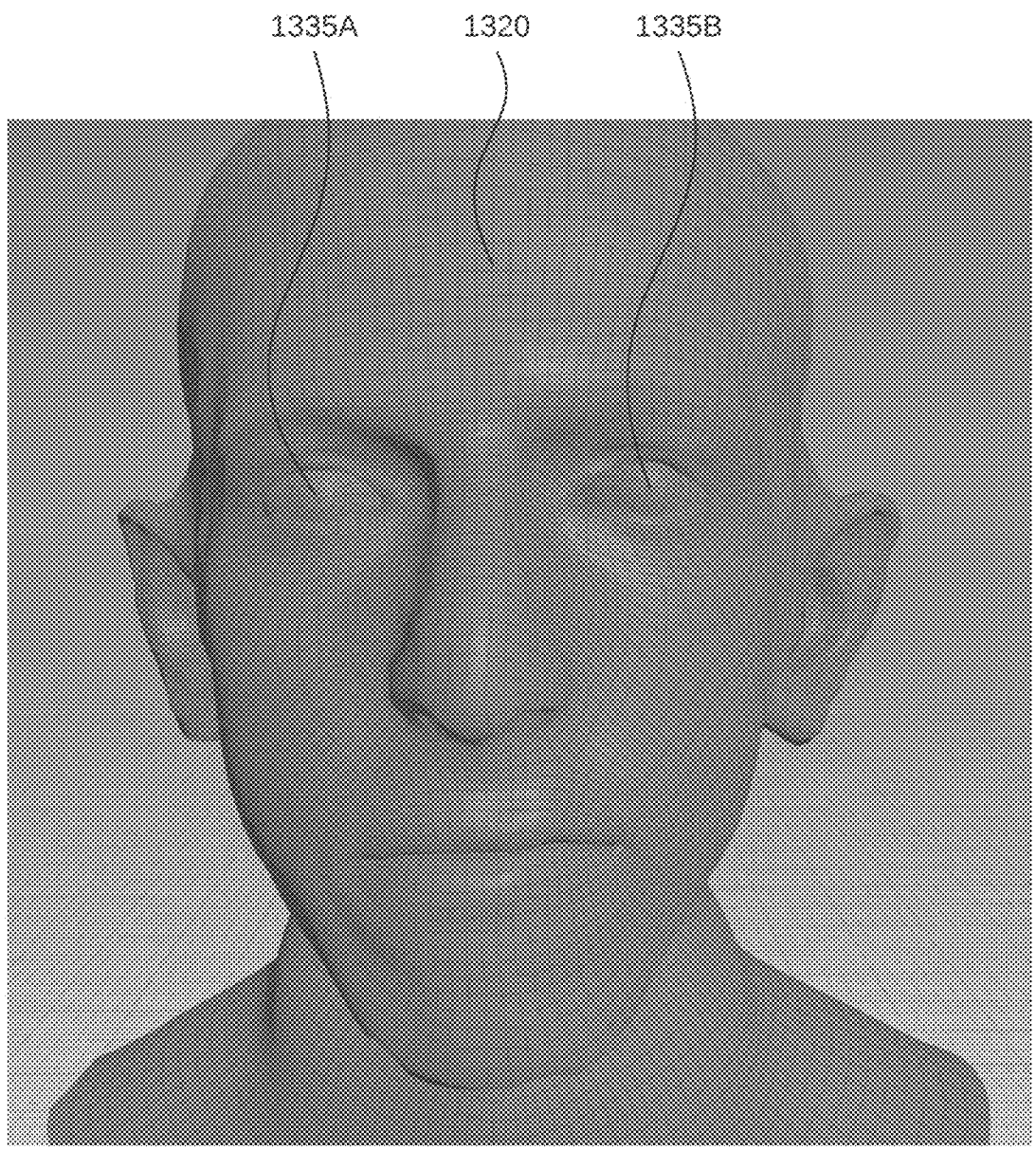

As an illustrative, non-limiting example to further describe coupling features to a composite mesh, reference is made to FIG. 13B, which depicts a composite mesh with feature insertion according to one or more illustrative aspects described herein. In FIG. 13B, composite mesh 1320 is shown. In some instances, composite mesh 1320 may be 3D character 1320 and may include a texture map as produced by sub-method 320B described in detail in FIG. 5. Composite mesh 1320 may include inserted eye features 1335A and 1335B. Eye features 1335A and 1335B may be inserted into the areas and particular polygons defined in FIG. 13A.

Figure 15:
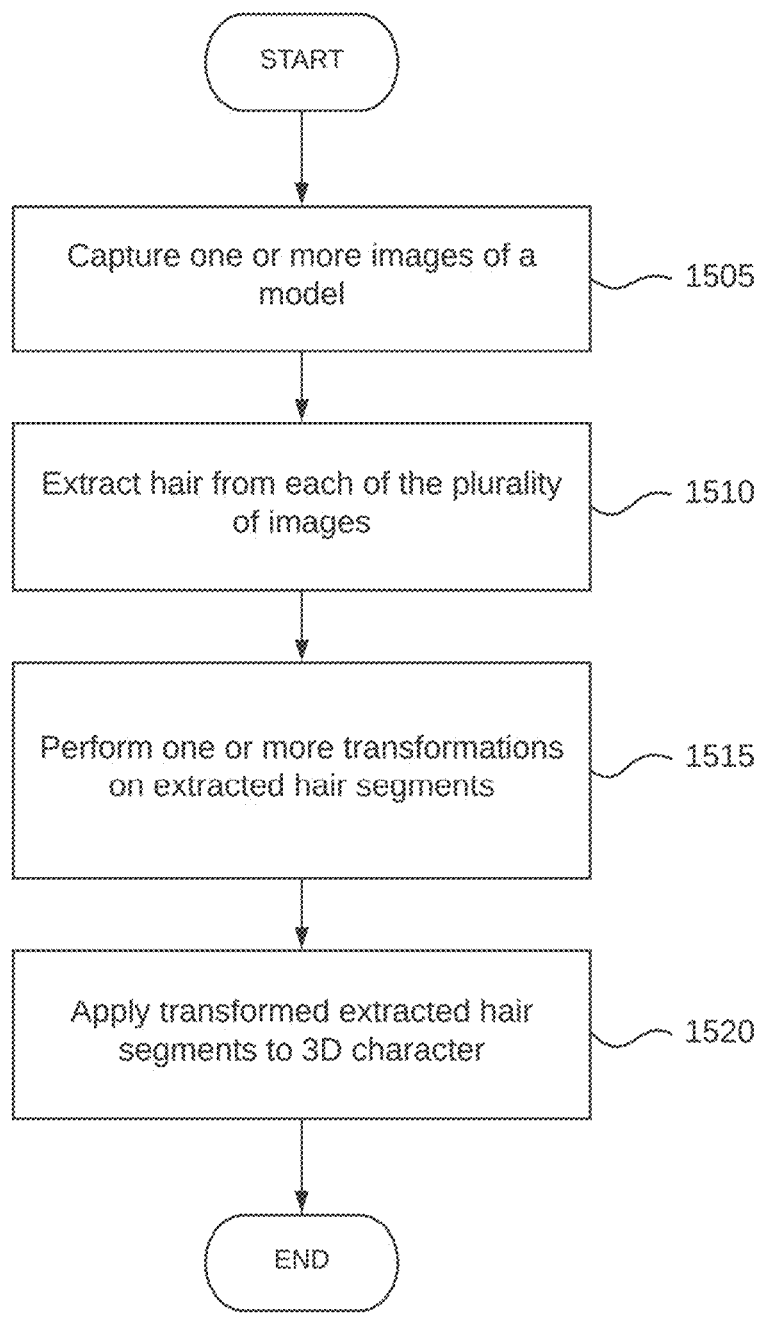
FIG. 15 depicts an alternative method of adding a hair feature to a 3D character according to one or more illustrative aspects described herein.

In further regard to step 335, reference is made to FIG. 15, which describes an alternative embodiment of adding a hair feature to a 3D character according to one or more aspects of the disclosure.

At step 1505, one or more images of a model may be captured with a photographic device. The model may be a human model, an animal model, a mannequin head wearing a wig, a human model wearing a wig, and/or any contraption resembling a head coupled with any prop resembling a wig. The one or more images of the model may be in any image format such as, but not limited to, JPEG, PNG, TIFF, and DNG, which may be taken on a photographic device such as, but not limited to, a DSLR camera, Point and Shoot camera, smartphone camera, and film camera. In some instances, the one or more images of the model may include a front portrait of the model facing the camera in a perpendicular direction to the camera lens, a left-side portrait of the model facing away from the camera in a parallel direction to the camera lens, a right-side portrait of the model facing away from the camera in a parallel direction to the camera lens, and/or a rear portrait of the model facing away from the camera in a perpendicular direction to the camera lens. Additionally, the one or more images of the model may further include portraits of the model taken from any position in 360 degrees around the model's head with the model facing in any direction relative to the camera lens. In some embodiments, the one or more of the model may consist of two images: a rear portrait of the model facing away from the camera in a perpendicular direction to the camera lens and either a left-side portrait of the model facing away from the camera in a parallel direction to the camera lens, or a right-side portrait of the model facing away from the camera in a parallel direction to the camera lens, and/or a rear portrait of the model facing away from the camera in a perpendicular direction to the camera lens.

At step 1510, a hair region on the model in each of the one or more images may be extracted from the remainder of the respective images. Photo editing tools such as Photoshop may be used to isolate and remove the hair region from each of the one or more images. In embodiments in which the one or more images of the model include a rear portrait and either a left or right-side portrait, the hair region on the model in each of the rear portrait and the left or right-side portrait may be isolated and extracted.

At step 1515, one or more transformations may be performed on the extracted hair regions from the one or more images. For example, as a first transformation, the extracted hair regions may be turned into a voxel mesh. In addition to the commonly known definition in the art, the term "voxel mesh," as used in the disclosure provided herein, may further correspond to a composition of pixels defined in a three-dimensional space, wherein each of the pixels have an associated volume. Additionally or alternatively, a second transformation may be performed on the extracted hair regions as formatted upon extraction from the one or more images, or the hair regions as transformed into a voxel mesh, to change the extracted hair regions or voxel mesh into a polygonal mesh. In some cases, a third transformation may be performed on the extracted hair regions as formatted upon extraction from the one or more images, the hair regions as transformed into a voxel mesh, or the hair regions as transformed into a polygonal mesh, involving conversion of vertical, terminal indices the extracted hair regions, voxel mesh hair transformation, or polygonal mesh hair transformation may be turned into splines. In addition to the commonly known definition in the art, the term "spline," as used in the disclosure provided herein, may further correspond to a mathematical curve that is created by determining specific points in space and interpolating between the specific points to generate the curve.

By transforming the extracted hair regions from the one or more images to a voxel mesh, followed by a polygonal mesh, followed by a spline, a more lifelike representation of hair may be created. For instance, during the first transformation from the one or more images into a voxel mesh, the resultant voxel mesh hair representation may capture the minute details of the hair as represented in the one or more images while also providing a malleable three-dimensional structure. During the second transformation from the voxel mesh to a polygonal mesh, the hair representation provided by the voxel mesh becomes rigid and more conducive to attachment on the composite mesh. In some instances, after the second transformation, the polygonal mesh representing the hair may applied to the 3D character produced at step 325. In performing the third transformation from the polygonal mesh to splines, more suitable attachment interfaces may be created on the 3D character for the creation of computer-generated hair which follows both the attachment to the 3D character, as well as the multi-dimensional curvatures of the hair as conveyed in the original one or more images.

At step 1520, the transformed extracted hair regions may be applied to the 3D character produced at step 325 and selected by the end user at step 330. In some instances, the transformed extracted hair regions produced in the method described in FIG. 15 may be applied to each 3D character produced at step 325. In other instances, a plurality of transformed extracted hair regions may be generated at step 335, and corresponding steps 1505-1515, for differing hairstyles, and each of the hairstyles may be applied to each of the 3D characters produced at step 325 and selected by the end user at step 330. In some embodiments, transformed extracted hair regions produced in step 335 may be correlated to the age, gender, and/or ethnicity of the 3D character selected by the end user at step 330.

In some cases, the resulting 3D character produced from the methods described herein may be 3D printed via a rapid prototyping technology such as, but not limited to, fused-deposition modeling (FDM), stereolithography (SLA), selective laser sintering (SLS), selective laser melting (SLM), digital light processing (DLP), electron beam melting (EBM), and laminated object manufacturing (LOM). The resulting 3D character may be directly exported to a rapid prototyping device, or may be converted to a particular file format before being sent to the rapid prototyping device for manufacture. During tangible manufacture of the 3D character, one or more materials and/or colorings of materials may be used in order to increase the end quality of the manufactured 3D character.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
    assigning one or more of a plurality of shrink-wrapped three-dimensional models to features on a base mesh, wherein each of the plurality of shrink-wrapped three-dimensional models includes a map;
    extracting a map selection from the shrink-wrapped three-dimensional models corresponding to the features to which the shrink-wrapped three-dimensional models were assigned; and
    generating a unique composite map, different from the maps of each of the plurality of shrink-wrapped three-dimensional models, by assembling the extracted map selections corresponding to each of the features on the base mesh such that the unique composite map is formed from the extracted map selections from disparate shrink-wrapped three-dimensional models.

2. The method of claim 1, wherein the features are demarcated on the base mesh by material IDs.

3. The method of claim 1, wherein the map is one or more of a texture, displacement, color, specular, roughness, normal, thickness, and occlusion map.

4. The method of claim 1, further comprising:
    blending intersections between extracted map selections of the unique composite map.

5. The method of claim 4, wherein the blending is performed on an intersection-by-intersection basis based on blending specifiers associated with the intersections of the extracted map selections.

6. The method of claim 4, wherein the blending is performed on an intersection-by-intersection basis based on maps of one or more shrink-wrapped 3D models associated with the intersections of the extracted map selections.

7. The method of claim 1, further comprising:
    identifying a first plurality of reference points on each of a plurality of three-dimensional models;
    identifying a second plurality of reference points on a polygonal proxy mesh;
    standardizing each of the plurality of three-dimensional models by associating each of the first plurality of reference points with a corresponding point of the second plurality of reference points, and adjusting the three-dimensional model so that the first plurality of reference points form substantially a same geometry as the second plurality of reference points; and
    shrink-wrapping the base mesh onto each of the plurality of standardized three-dimensional models.

8. The method of claim 1, wherein generating the unique composite map comprises assembling the extracted map selections corresponding to a usage limit associated with each of the plurality of shrink-wrapped three-dimensional models.

9. One or more non-transitory computer-readable media storing storing instructions that, when executed by a computing device comprising at least one processor and memory, cause the computing device to: assign one or more of a plurality of shrink-wrapped three-dimensional models to features on a base mesh, wherein each of the plurality of shrink-wrapped three-dimensional models includes a map; extract a map selection from the shrink-wrapped three-dimensional models corresponding to the features to which the shrink-wrapped three-dimensional models were assigned; and generate a unique composite map, different from the maps of each of the plurality of shrink-wrapped three-dimensional models, by assembling the extracted map selections corresponding to each of features on the base mesh such that the unique composite map is formed from the extracted map selections from disparate shrink-wrapped three-dimensional models.

10. The one or more non-transitory computer-readable media of claim 9, wherein the features are demarcated on the base mesh by material IDs.

11. The one or more non-transitory computer-readable media of claim 9, wherein the map is one or more of a texture, displacement, color, specular, roughness, normal, thickness, and occlusion map.

12. The one or more non-transitory computer-readable media of claim 9, storing further instructions that, when executed by the computing device comprising at least the one processor and memory, cause the computing device to:
    blend intersections between extracted map selections of the unique composite map.

13. The one or more non-transitory computer-readable media of claim 12, wherein the blending is performed on an intersection-by-intersection basis based on blending specifiers associated with the intersection of the extracted map selections.

14. The one or more non-transitory computer-readable media of claim 12, wherein the blending is performed on an intersection-by-intersection basis based on maps of one or more shrink-wrapped 3D models associated with the intersection of the extracted map selections.

15. The one or more non-transitory computer-readable media of claim 9, wherein the generating of the unique composite map comprises assembling the extracted map selections corresponding to a usage limit associated with each of the plurality of shrink-wrapped three-dimensional models.

16. The one or more non-transitory computer-readable media of claim 9, storing further instructions that, when executed by the computing device comprising at least the one processor and memory, cause the computing device to:

identify a first plurality of reference points on each of a plurality of three-dimensional models;

identify a second plurality of reference points on a polygonal proxy mesh;

standardize each of the plurality of three-dimensional models by associating each of the first plurality of reference points with a corresponding point of the second plurality of reference points, and adjusting the three-dimensional model so that the first plurality of reference points form substantially a same geometry as the second plurality of reference points; and shrink-wrap the base mesh onto each of the plurality of standardized three-dimensional models.

17. A system, comprising:

at least one processor; and memory storing computer-readable instructions that, when executed by the at least one processor, cause the system to:

assign one or more of a plurality of shrink-wrapped three-dimensional models to features on a base mesh, wherein each of the plurality of shrink-wrapped three-dimensional models includes a map;

extract a map selection from the shrink-wrapped three-dimensional models corresponding to the features to which the shrink-wrapped three-dimensional models were assigned; and generate a unique composite map, different from the maps of each of the plurality of shrink-wrapped three-dimensional models, by assembling the extracted map selections corresponding to each of features on the base mesh such that the unique composite map is formed from the extracted map selections from disparate shrink-wrapped three-dimensional models.

18. The system of claim 17, wherein the features are demarcated on the base mesh by material IDs.

19. The system of claim 17, wherein the map is one or more of a texture, displacement, color, specular, roughness, normal, thickness, and occlusion map.

20. The system of claim 17, wherein the memory stores further computer-readable instructions that, when executed by the at least one processor, cause the system to:

blend intersections between extracted map selections of the unique composite map.

21. The system of claim 20, wherein the blending is performed on an intersection-by-intersection basis based on blending specifiers associated with the intersection of the extracted map selections.

22. The system of claim 20, wherein the blending is performed on an intersection-by-intersection basis based on maps of one or more shrink-wrapped 3D models associated with the intersection of the extracted map selections.

23. The system of claim 17, wherein the generating of the unique composite map comprises assembling the extracted map selections corresponding to a usage limit associated with each of the plurality of shrink-wrapped three-dimensional models.

\* \* \* \* \*